United States Patent
Mayer et al.

[11] Patent Number: 6,151,161
[45] Date of Patent: Nov. 21, 2000

[54] HIGH-PRECISION COMPUTER-AIDED MICROSCOPE SYSTEM

[75] Inventors: William J. Mayer, South Barrington; Norman J. Pressman, Glencoe; Richard A. Domanik, Libertyville, all of Ill.

[73] Assignee: AccuMed International, Inc., Chicago, Ill.

[21] Appl. No.: 09/174,140

[22] Filed: Oct. 16, 1998

Related U.S. Application Data

[60] Provisional application No. 60/064,558, Oct. 17, 1997, and provisional application No. 60/064,559, Oct. 20, 1997.

[51] Int. Cl.[7] .................................................. G02B 21/26
[52] U.S. Cl. ............................. 359/392; 359/393
[58] Field of Search ..................... 359/392, 393, 359/391, 368

[56] References Cited

U.S. PATENT DOCUMENTS

| | | |
|---|---|---|
| 2,083,820 | 6/1937 | Bissell . |
| 2,621,559 | 12/1952 | Gradisar ................................. 359/391 |
| 3,517,183 | 6/1970 | Rebres . |
| 4,284,327 | 8/1981 | Kraft et al. . |
| 5,022,744 | 6/1991 | Leiter . |
| 5,264,928 | 11/1993 | Howes . |
| 5,438,451 | 8/1995 | Schweizer ............................. 359/393 |
| 5,457,571 | 10/1995 | Longoria et al. . |
| 5,559,631 | 9/1996 | Remer et al. . |
| 5,638,206 | 6/1997 | Sumiya et al. ........................... 359/393 |
| 5,684,628 | 11/1997 | Gerhard .................................. 359/393 |

FOREIGN PATENT DOCUMENTS

| | | |
|---|---|---|
| 0 081 161 | 6/1983 | European Pat. Off. . |
| 0 245 089 | 11/1987 | European Pat. Off. . |
| 0 731 371 A1 | 9/1996 | European Pat. Off. . |
| 35 35 749 A1 | 10/1986 | Germany . |
| 35 42 798 A1 | 7/1987 | Germany . |
| 42 32 079 A1 | 3/1994 | Germany . |
| 44 43 067 | 10/1995 | Germany . |
| 195 32 897 A1 | 3/1996 | Germany . |
| 60-143313A | 7/1985 | Japan . |
| WO/90 12335 | 10/1990 | WIPO . |
| WO 94 07167A | 3/1994 | WIPO . |

*Primary Examiner*—Jon Henry
*Attorney, Agent, or Firm*—McDonnell Boehnen Hulbert & Berghoff

[57] ABSTRACT

A system for facilitating microscope-based specimen analysis is disclosed. The system includes an improved optical microscope, which may be used, in one application, to analyze cell and tissue samples from specimens obtained from patients, to facilitate inspection of suspicious materials and identification of atypical or abnormal cells and further expert review. The system includes a motorized plate, an automatic focusing sub-system, an improved light source, an improved simple plug connector for direct hookup of the microscope to an external computer, and an electronic image capturing and analyzing sub-system for automatic scanning of the sample and for electronic capture and storage of images indicative of the specimen.

39 Claims, 24 Drawing Sheets

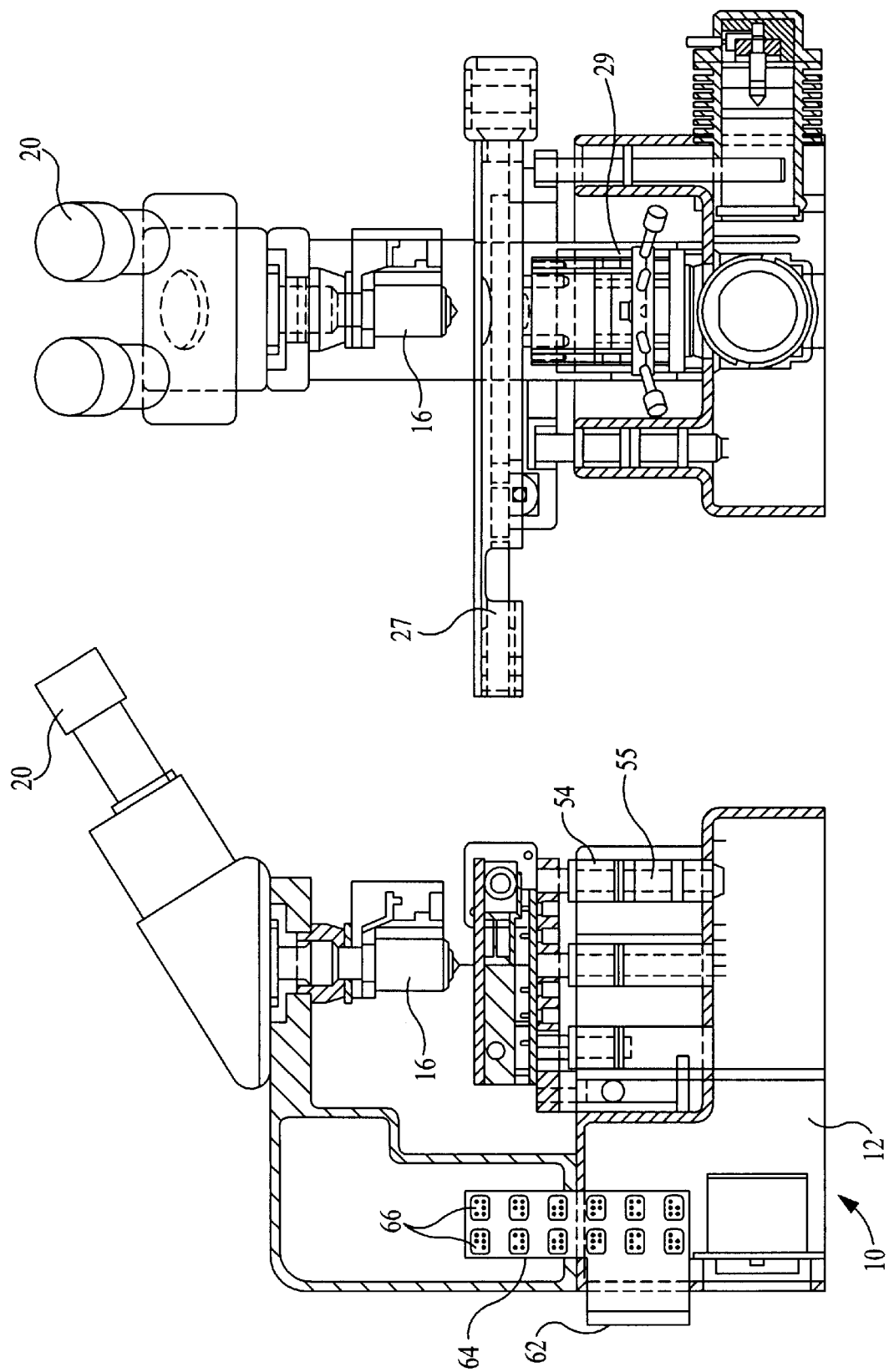

HIGH-PRECISION COMPUTER-AIDED MICROSCOPE SYSTEM

REFERENCE TO RELATED APPLICATIONS

This application claims priority benefits under 35 U.S.C. § 119 to U.S. provisional application Serial No. 60/064,558, filed on Oct. 17, 1997, and to U.S. provisional application Serial No. 60/064,559, filed on Oct. 20, 1997.

BACKGROUND OF THE INVENTION

1. Field of the Invention

The present invention is related generally to the field of microscopy, and more particularly to the configuration of optical microscopes and microscope-based electronic imaging systems.

2. Description of the Related Art

In its most basic form, a microscope typically includes a base, a plate or stage for holding a sample, a magnifier commonly including a series of lenses, and a viewer for presenting a magnified image to an observer. The principal purpose of a microscope is to create a magnified image of a sample of a specimen and to accurately present the enlarged image to an observer or to an electronic imaging apparatus used for image acquisition, display, measurement, analysis, communication, archiving, or data management.

Over the years, microscopes have evolved into very complex and sophisticated optical instruments, taking a variety of forms. While most microscopes are manually operable and may present a magnified image for viewing by an operator, one of the most important recent advances in microscopy has been the development of automated, computer-aided microscopes. Most computer-aided microscopes include the conventional elements of manually operated microscopes but are further configured in combination with a digital computer. The computer may serve a variety of functions, such as, for instance, controlling the position of a motorized stage, controlling the focusing system, or controlling other optical components such as microscope objectives.

In a typical arrangement, a computer-aided microscope system includes an electronic photodetector or imaging system such as a video or CCD camera interconnected to the viewer, with the output from the detector being fed into a computer processor for a variety of functions including analysis or image enhancement or display. The computer processor in turn may provide control signals to the microscope, for instance, to control the stage position, focus drive or other aspects of the system. Provided with this arrangement, a computer-aided microscope may enable the automatic analysis of a wide variety of objects, such as cytological samples, pathology specimens or semiconductor chips (solid state devices). Further, the automated analysis may be easily enhanced by appropriate computer programming as well as by the addition of assorted peripherals (such as data storage devices and interactive user-input devices).

In automated cytology sample analyses, for instance, a specimen is drawn from a patient, a sample is prepared from that specimen, and the sample is placed into the automated microscope. An image detector (e.g., CCD camera) may electronically scan the sample and thereby receive digital images of discrete regions of the sample. The detector may then feed these digital images to a processor, which stores the images in memory and analyzes the images. In addition, the processor may receive from the microscope an indication of the spatial coordinates of the stage (e.g., X and Y planar coordinates, and a Z focus coordinate). Through complex image analysis algorithms, the processor may identify cellular matter of interest in the sample and may then mark in memory an indication of the stage position coordinates associated with that cellular matter. Samples may be deposited on slides with fiducial marks to ensure that the X-Y locations are accurate from microscope to microscope or calibration procedures can be developed and used to ensure that the X-Y coordinates apply from machine to machine.

In turn, once the processor completes its analysis, it may generate a routing function keyed to the stage coordinates and defining an order by which the automated microscope should present areas of the sample to an operator such as a cytotechnologist. Through use of this routing function, the computer processor may thus control the microscope stage position and microscope focus, and may thereby present the cellular matter or other objects or optical fields of interest to the operator through the microscope field of view. In addition, or alternatively, the automated-microscope system may be configured to include a computer monitor, which may present the microscopic fields of view to the operator without requiring the operator to look through the microscope ocular(s).

As a general rule, precision, accuracy and speed are critical to the useful operation of a microscope in addition to the quality (e.g., resolution) of the optical magnification devices and processes. This is particularly important for computer-aided microscopy systems. In cytological specimen analysis, for instance, a cytotechnologist typically needs to be able to locate atypical or abnormal cells in specimens rapidly, precisely and accurately, since cells are typically less than a few hundred microns in their maximum linear dimension. While many cancer-related cytological changes are characteristic and can be detected and classified with a high degree of accuracy by an appropriately configured microscope, inaccurate or imprecise microscope configurations can be the source of unacceptable false positive or false negative cell classifications and sample specimen diagnoses.

Further, modern vision systems employing computer-aided image analysis have imposed on microscopes even more stringent requirements for high precision, mechanical stability and optical and illumination repeatability. Unfortunately, however, traditional mechanical (e.g., fully manual) microscope systems, as well as many of the currently available automated microscope systems, have not provided the positional accuracy, repeatability, stability and resolution required for reliable, reproducible quantitative microscopic imaging applications.

To ensure proper operation, for instance, a microscope must be as stable as possible. The microscope must be stable in the presence of ambient vibrations and also stable with respect to internally introduced vibrations. However, the motorized stages in some existing automated-microscope configurations are unstable. Consequently, these existing systems cannot rapidly, accurately, precisely and repeatedly locate and focus on diagnostically significant areas of a sample from a specimen.

Traditional optical microscopes, for example, enable movement of the stage by way of a cantilevered system that is offset from the optical path of the microscope. In other systems, as the present inventors have recognized, the stage is moved through the exertion of a force at a position other than the center of gravity or center of effort of the plate. Consequently, existing microscopes tend to generate yaw, pitch, roll and droop errors (i.e., introduce a third derivative, "jerk") during stage movement. These errors are particularly troublesome in the context of automated computer-aided microscopy. It is also problematic for human observers who also need stage motion to be dampened before they can visualize a temporally stable image.

Similarly, in microscope systems that employs a detector (such as a camera) to capture magnified images, the detector itself must remain stable during operation. However, in most such systems, the detector is attached only to the viewer of the microscope. As recognized by the present inventors, this configuration thereby increases the likelihood that the camera will become unstable or misaligned during operation, potentially rendering the camera unable to capture magnified images properly.

Further, to ensure proper operation, the sample being analyzed in a microscope needs to be properly illuminated and have proper spectral density. This is particularly the case in microscopes that employ detectors, such as cameras, to capture magnified images, as the detectors are often configured to operate optimally with a particular level of light. This is also the case whenever there is spectral-based analysis of a sample. In these systems, if the sample is illuminated with insufficient or excessive light, or with improper spectral characteristics, the detector may need to compensate for the imperfect illumination and thereby operate less than optimally. Still further, the level of illumination in a microscope is important even for manual viewing through the oculars, as appropriate illumination is required to allow human perception of the magnified sample through the microscope lenses.

Still further, a typical microscope includes a variety of adjustable elements. These elements include, for instance, condenser lens focus, condenser lens centration, lamp filament centration, condenser aperture, and field diaphragm. To ensure proper operation of the microscope system, most or all of these elements need to be adjusted by an operator or an automated controller before analysis can begin. For example, to properly focus a diffused image at the light source, the condenser lens focus must be properly adjusted. As another example, to achieve lamp photon emitter centration, an operator must typically adjust the microscope light source if the light source is not properly centered. Unfortunately, however, adjustment of these elements can be time consuming and tedious.

In view of the deficiencies in the art, there is a need for an improved configuration of a high-precision, automated or computer-aided microscope.

SUMMARY OF THE INVENTION

The present invention provides an improved microscope system. In one aspect, the system may include an improved method and apparatus for guiding system for the plate. In a second aspect of the invention, the system may include an improved method and apparatus for moving the stage. In a third aspect of the invention, the system may include an improved method and apparatus for maintaining proper illumination. In a fourth of the invention, the system may include an improved method and apparatus for maintaining proper spectral density. In a fifth aspect of the invention, the system may include an improved method and apparatus for maintaining proper placement of the light source, for configuring a fixed optics system. In a sixth aspect of the invention, the system may include an improved method and apparatus for maintaining proper placement of the imaging system. In a seventh aspect of the invention, the system may include an improved method and apparatus for fixing the optics in the microscope for an automated system. The invention may facilitate enhanced electronic image capture and analysis and may be particularly suitable for use in the context of cytological or histological sample analysis. However, the invention is not limited to analysis of biomedical specimens but may more generally be used for analysis of any type of sample from any type of specimen.

A principal object of the present invention to provide a computer-aided microscope system that facilitates quick, stable and reproducible microscopic presentation of goals. Another objective of the invention is to provide a microscope having geometric accuracy in the three-motion axes. Still another object of the invention is to provide a microscope that remains stable when performing high-speed moves.

A further goal of the invention is to provide a microscope that does not vary appreciably in terms of optical alignment. Yet a further objective of the invention is to provide a microscope that has constantly controlled and repeatable illumination systems. Still another object of the invention is to provide a microscope that may be incorporated into higher level imaging and analytical instruments. Yet another object of the invention is to provide a microscope in combination with a detector, such as a camera or a photomultiplier tube assembly, whereby the photodetector(s) remain(s) in proper alignment during their image acquisition operation.

These and other features and advantages of the present invention will be better understood by reading the following detailed description, with appropriate reference to the accompanying drawings.

BRIEF DESCRIPTION OF THE DRAWINGS

Various objects, features, and attendant advantages of the present invention can be more fully appreciated and become better understood with reference to the following detailed description of the present invention when considered in connection with the accompanying drawings, in which:

FIG. 2a is a side cutaway view of a microscope assembly according to an embodiment of the invention;

FIG. 2b is a front cutaway view of the microscope assembly shown in FIG. 2a;

FIG. 2c a side cutaway view of the microscopic assembly shown in FIG. 2a;

FIG. 2d is a side cutaway view of a lower portion of the microscope assembly shown in FIG. 2a;

FIGS. 2e–f are cutaway views of the stage of the microscopic assembly shown in FIG. 2a;

FIG. 2h is a front cutaway view of the microscope assembly shown in FIG. 2a;

FIG. 2i is a side cutaway view of the microscope assembly shown in FIG. 2a;

FIGS. 3a–c are cutaway views of the focus drive and switches of the microscope assembly shown in FIG. 2a;

FIG. 4a is a side cutaway view of the centralized filament, mirrors and lenses of the microscope assembly shown in FIG. 2a;

FIG. 4b is a cutaway view of the light source assembly shown in FIG. 4a;

FIG. 4c is a block diagram of the light feedback system for the light source assembly shown in FIG. 4a;

FIG. 5b is a top cutaway view of the fixed condenser geometry of FIG. 5a;

DETAILED DESCRIPTION OF A PREFERRED EMBODIMENT

Referring to FIGS. 1–6, there is shown a schematic block diagram of a system that incorporates the principles of the invention. In particular, the Figures illustrate a system having the capability to capture images of a sample from a specimen collected from an individual and placed upon a slide, and to analyze the sample rapidly, accurately, and precisely. The microscope system may be incorporated into a variety of settings and a variety of applications. Referring to FIG. 1a, there is shown one example of a suitable configuration employing a microscope system according to the present invention. An automated video microscope having image analysis capabilities is coupled to a Data Management System (DMS). In one embodiment of the invention, the DMS comprises a conventional computer system with a processor and memory that contains patient medical history and demographic data relevant to the specimens being screened. The DMS preferably takes the form of a programmed general purpose desktop IBM-PC compatible computer which has sufficient storage and processing capability to run the Microsoft Windows operating environment and the Microsoft Visual Basic and Microsoft Access application programs. The DMS and the image analyzer are preferably coupled via a high-speed serial data link. The DMS may also be coupled to other data processing equipment via various types of local or wide area networks. In alternative embodiments, other data computing equipment may be used as would be known to persons of ordinary skill in the art. As shown in FIG. 1a, a slide magazine 18, a bar code scanner 21 and display 17 may be used in combination with the microscope.

Figure 1A:
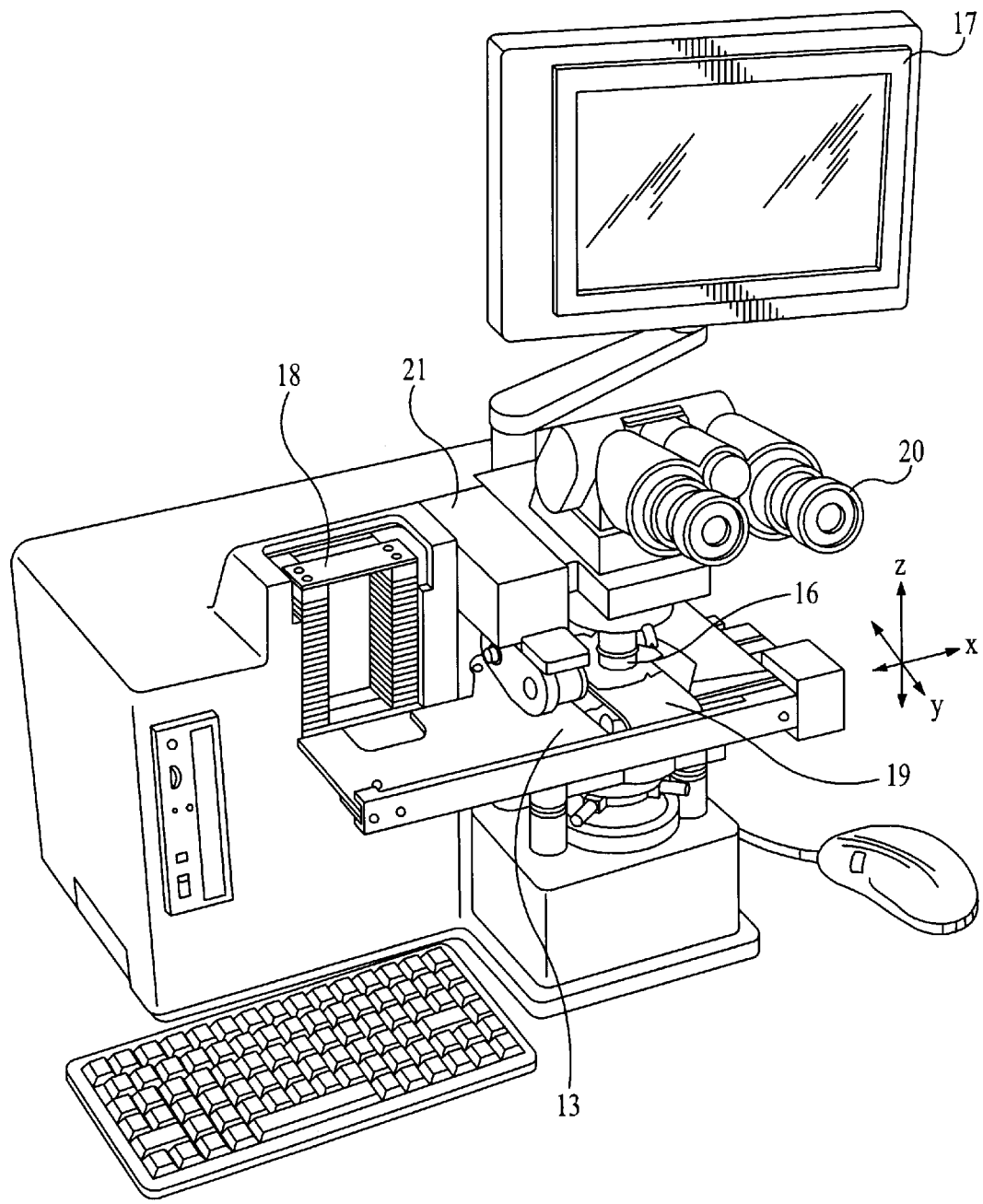
FIG. 1a is a perspective view of a microscope system in an embodiment of the invention, in combination with other components such as a display, barcode reader, and slide magazine.
Figure 1B:
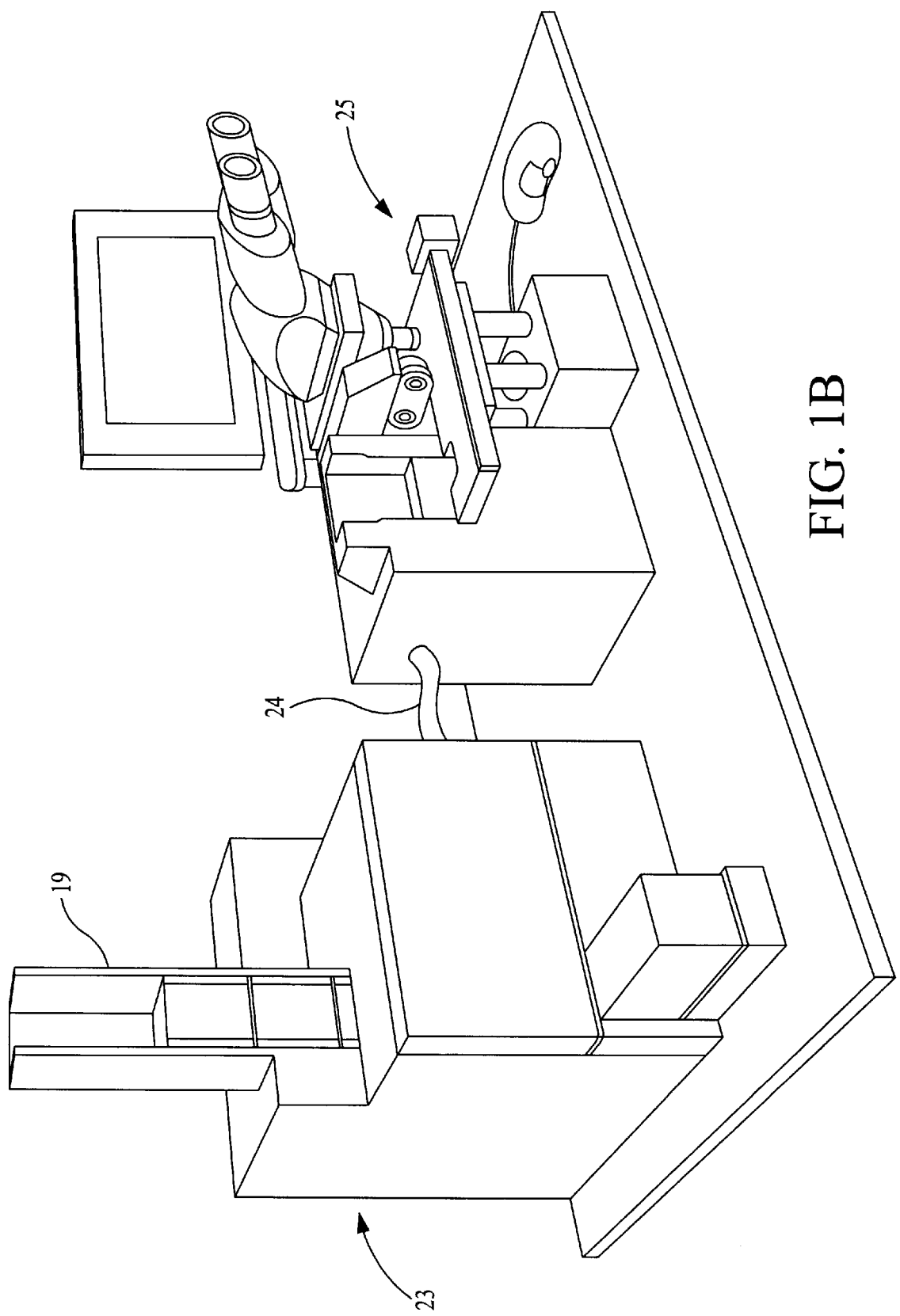
FIG. 1b is a perspective view of two microscopes in another embodiment of the invention.

Referring to FIG. 1b, there is shown a second application of the microscope. Automated sample analysis system 23 includes a microscope with fixed optics, described subsequently, and a computer system. Samples are input via a slide magazine 18, analyzed with the computer in combination with the microscope. The data from the analysis is sent via a cable 24 to an operator-based sample analysis system 25, which also includes a microscope. The operator-based sample analysis system 25 receives the data from the automated sample analysis system 23 and the operator, through use of the microscope, facilitates analysis of the sample with the assistance of the data from the automated sample analysis system 23.

The microscope may be used in combination with a detector for sensing the magnified image of the sample, as discussed subsequently with respect to FIG. 6. In one embodiment, the detector is a high resolution, scientific grade charge coupled device ("CCD"), such as may be used in a video camera. However, the invention is not limited to use of a CCD, but may use other means for capturing or viewing an image. Such devices may include, for instance, in addition to CCD cameras and traditional video cameras, photomultiplier tube (PMT) assemblies. The camera is preferably affixed to a video-port on top of the eyepiece of the microscope in order to capture cell images. A variety of cameras are available, depending on the resolution requirements (including spectral resolution, spatial resolution, photometric resolution and temporal resolution) of the user. Three available video cameras include the Pulnix TM-1001 available from Pulnix Corp. of Sunnyvale, Calif., the Kodak Megaplus ES1.0 from Eastman Kodak of Rochester, N.Y. and the SMD 1M15 from Silicon Mountain Devices of Colorado Springs, Colo. A lens with 10×magnification, 0.4 numerical aperture (other magnifications or numerical apertures may be chosen depending on the ultimate application), provides the combination of a large field of view as well as the high spatial resolution to facilitate efficient specimen screening by a single objective lens.

Images received by the camera are captured by a Data Raptor type frame grabber available from Bit Flow Corp., Woburn, Mass., and transferred to an image analyzer for analysis. The microscope and image analyzer are coupled by a serial data link which permits the image analyzer to initiate control of an autofocus function on the microscope and to capture specimen position information. The microscope is preferably controlled by a controller board, which is described in further detail in related patent applications entitled "System for Simplifying the Implementation of Specified Functions and Multifunctional Control Unit for a Microscope," U.S. patent application Ser. No. 08/529,188, filed on Sep. 15, 1995, the entirety of which is hereby incorporated by reference.

Referring to FIGS. 1 and 2a–2g, there are shown various cutaway views of a microscope 10. The microscope 10 preferably includes a number of sub-elements, including a base 12, a Z-axis plate 13, a Y-axis slide 14, an X-axis slide 15, magnifying lens(es) (such as objective 16), slide holder 19, eyepiece 20, and light source. The Z-axis plate 13 supports the slide containing the sample, moving the sample in the Z-direction, as shown in the Figures. The Y-axis slide 14 moves the sample in the Y-direction while the X-axis slide 15 moves the sample in the X-direction shown in the Figures. The base provides rigid support for the microscope and, as shown in the Figures, may form the bottom portion of the microscope. In an alternative embodiment, the base may include an upper portion. Moreover, in FIGS. 2a–2d and FIGS. 2g–2i, the light source 77 is attached to the base and the path of light from the light source 77 travels through the base. In an alternate embodiment, the light source 77 may be attached to an upper portion of the microscope.

The controller board within the microscope 10 receives signals from the multifunctional control unit. The controller board preferably generates and transmits signals to control the operation and movement of the aforesaid components of the microscope, and to transmit and receive information, via ports 66 as shown in FIG. 2a, to and from the DMS. In some embodiments, the controller board may control the transmission and selection of information between the microscope 10, camera, frame grabber, image analyzer, and the DMS. In still other embodiments, a computer may be used to control the operation and movement of the components of the microscope 10. The images received from the microscope 10 may also be selectively sent to a computer for processing. The computer also controls the light level, the power turret, which selects the lens for viewing the sample, the stage translation speed, the spatial orientation of the sample on the Z-axis plate 13, the Y-axis slide 14 and the X-axis slide 15, and the intensity and color temperature/illumination control.

Figure 2C:
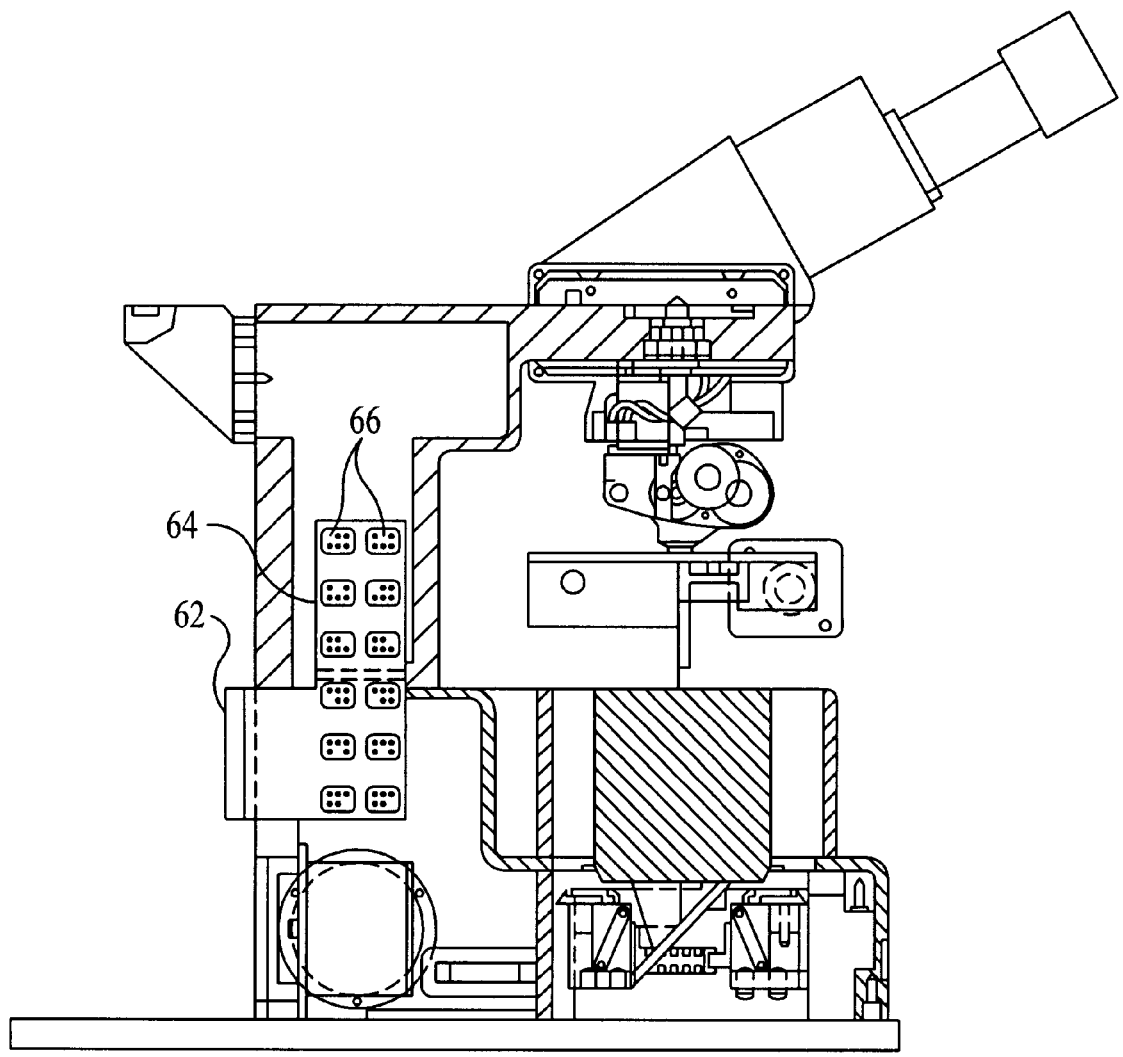
Figure 2D:
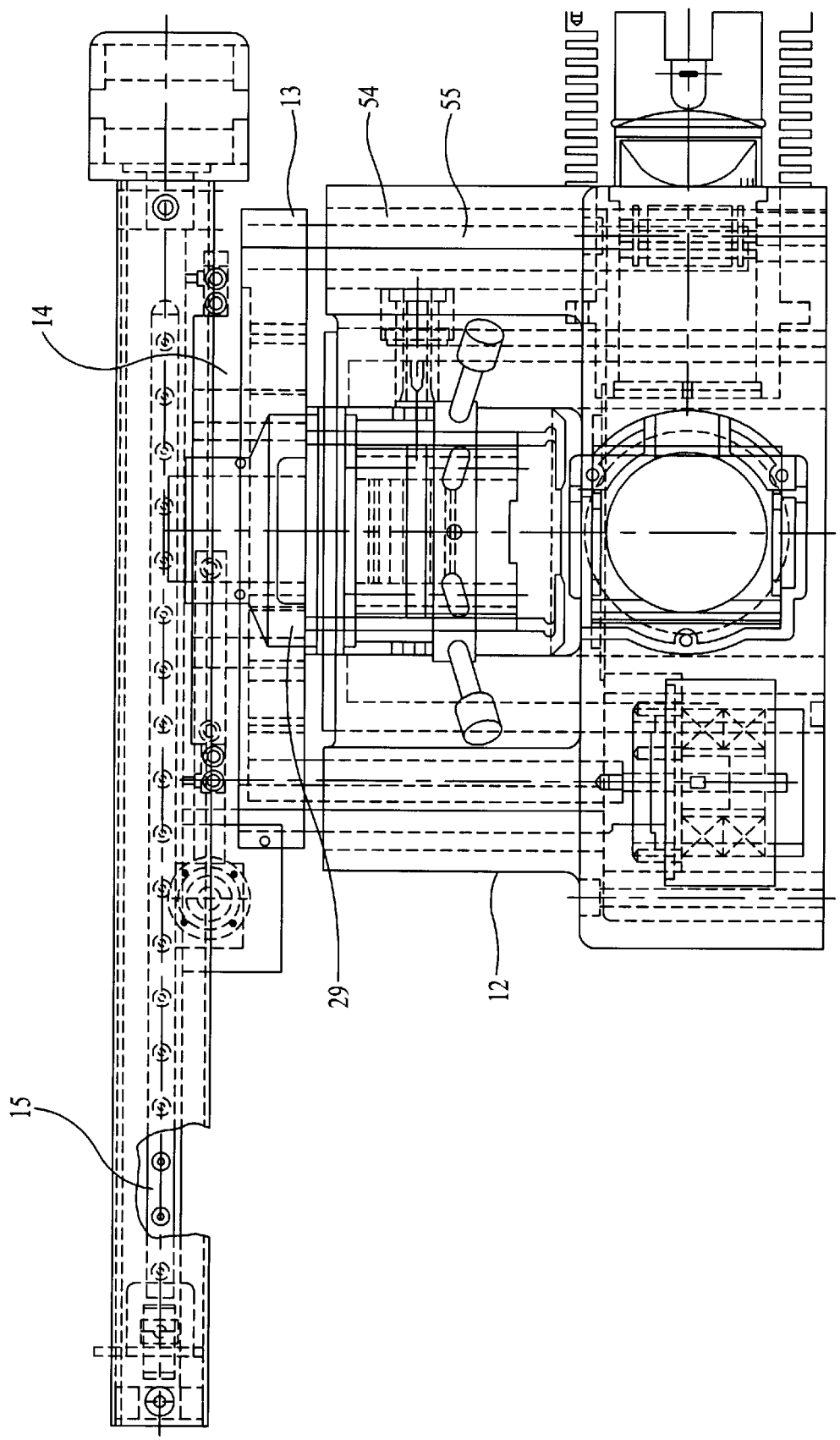
Figure 2E:
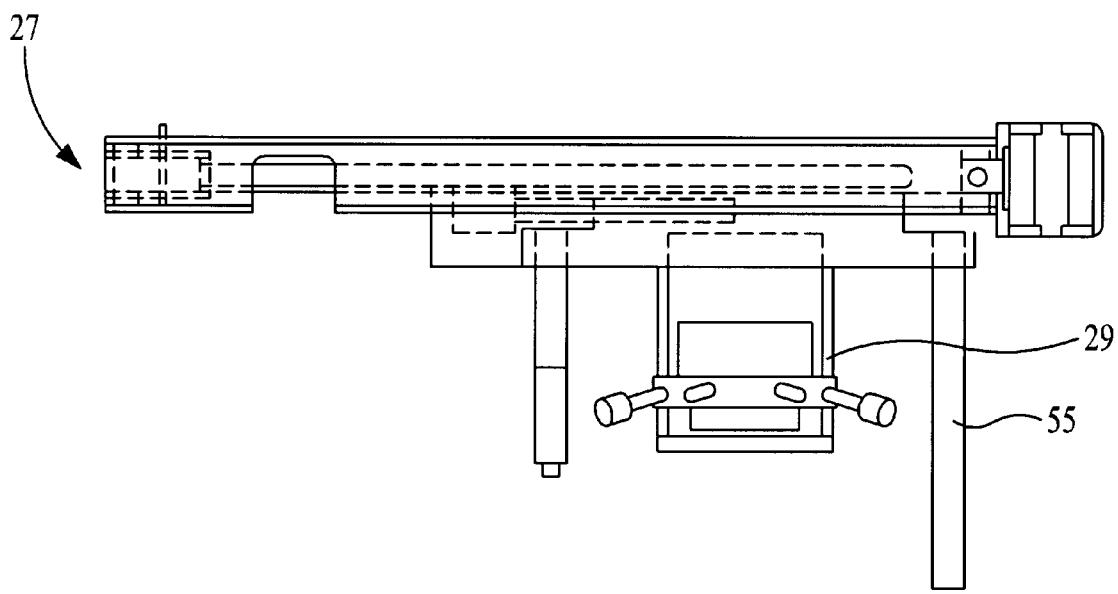
Figure 2F:
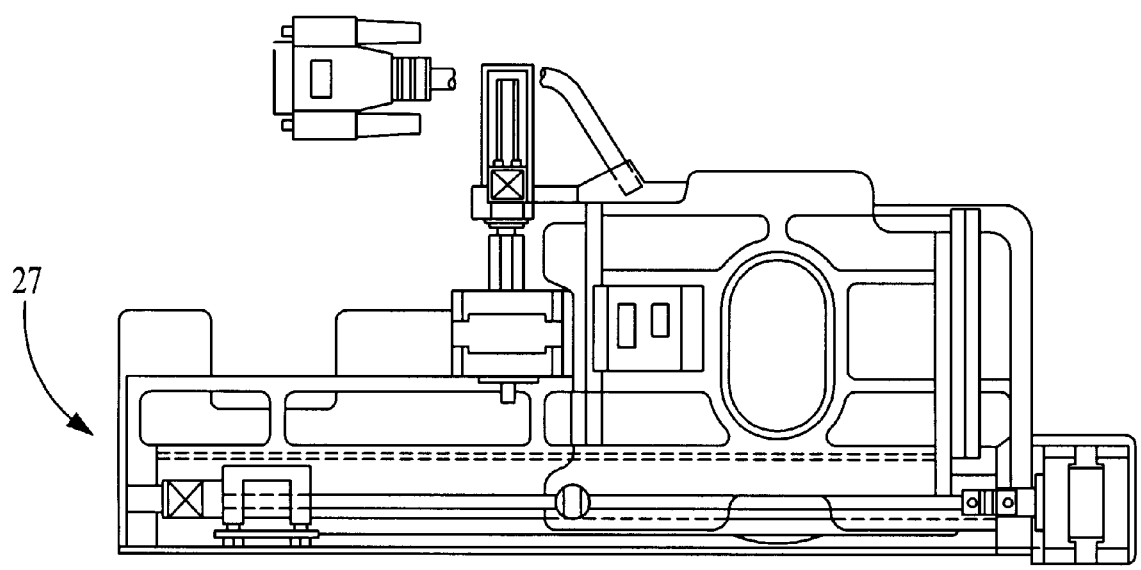

Referring to FIG. 2c, there is shown a side cutaway view of the lower portion of the microscope. Included in this portion is the stage 27, which is shown as side and top cutaway views in FIGS. 2e and 2f, respectively. The stage 27 typically is the portion of the microscope that provides movement of the sample. The stage 27 may moves upward and downward during focusing and may include a plate. A plate may be an object which, either directly (by direct physical contact) or indirectly (through another object), holds the sample. In a preferred embodiment, the stage 27 includes the Z-axis plate 13, the Y-axis slide 14, the X-axis slide 15, the condenser lens system 29, and guideposts 55. The stage 27 is moved by a device that applies force at a specific point of the Z-axis plate 13. As discussed subsequently, the force is preferably applied at a single point via an elevating screw 89, in a preferred embodiment, that works in combination with a motor assembly. This placement of a single, specific point of force on the Z-axis plate 13 of the stage provides for greater stability when moving the stage 27. If a single point of force for moving the stage 27 is chosen, it is preferably applied at, or substantially at, the center of gravity of the stage 27 in order to reduce the amount of geometric errors. This configuration improves over typical microscopes, in which the manner of moving the stage is to apply force to the stage at points that are not at the center of effort or gravity. For example, a typical cantilever bearing system (commonly referred to as the knee and column design) may increase the possibility of geometric errors while viewing due to the offset manner of moving the stage. Moreover, as the inventors have discovered, this prior art method creates instability while moving the stage.

Figure 2G:
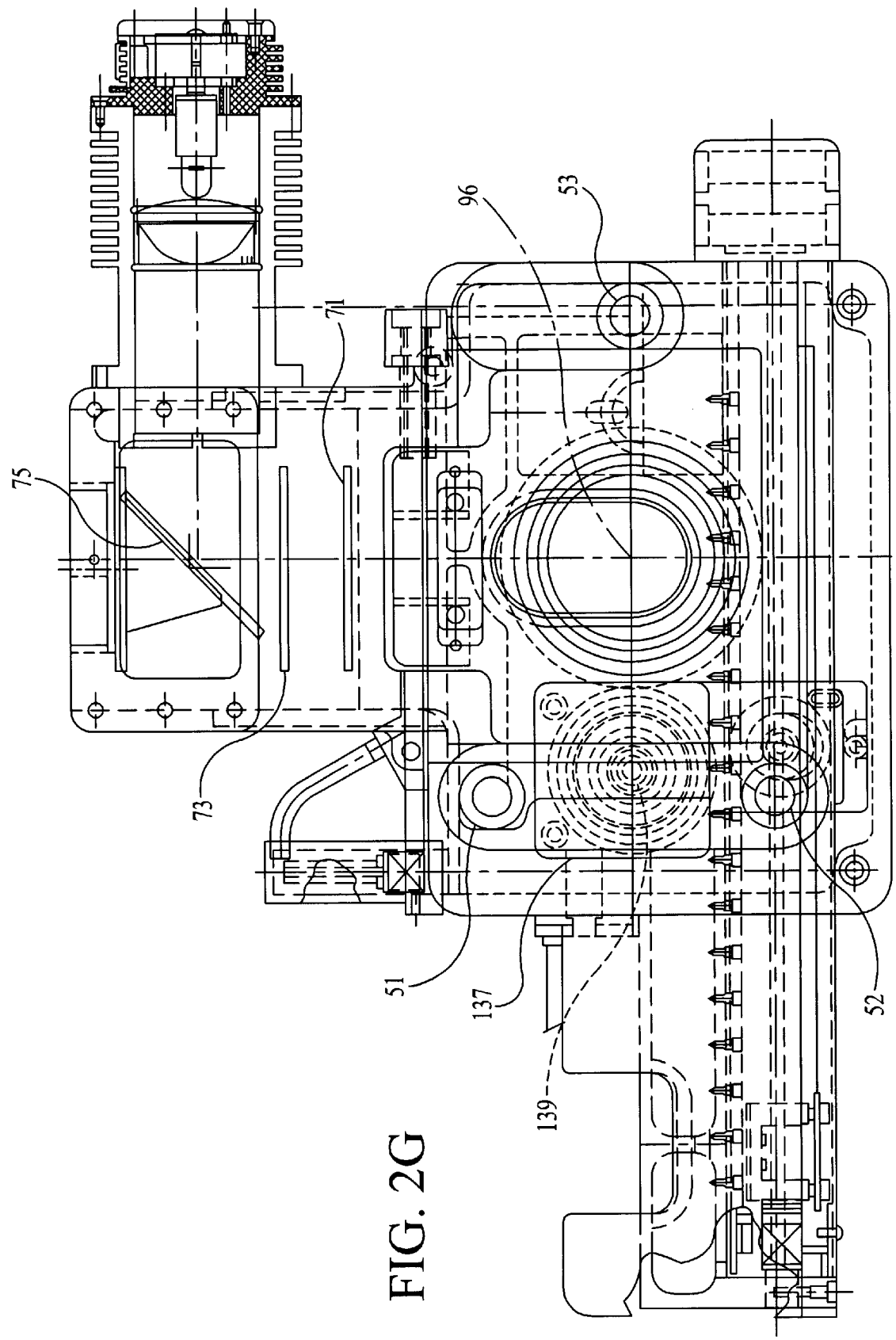
FIG. 2g is a top cutaway view of the microscope assembly shown in FIG. 2e.
Figure 2H:
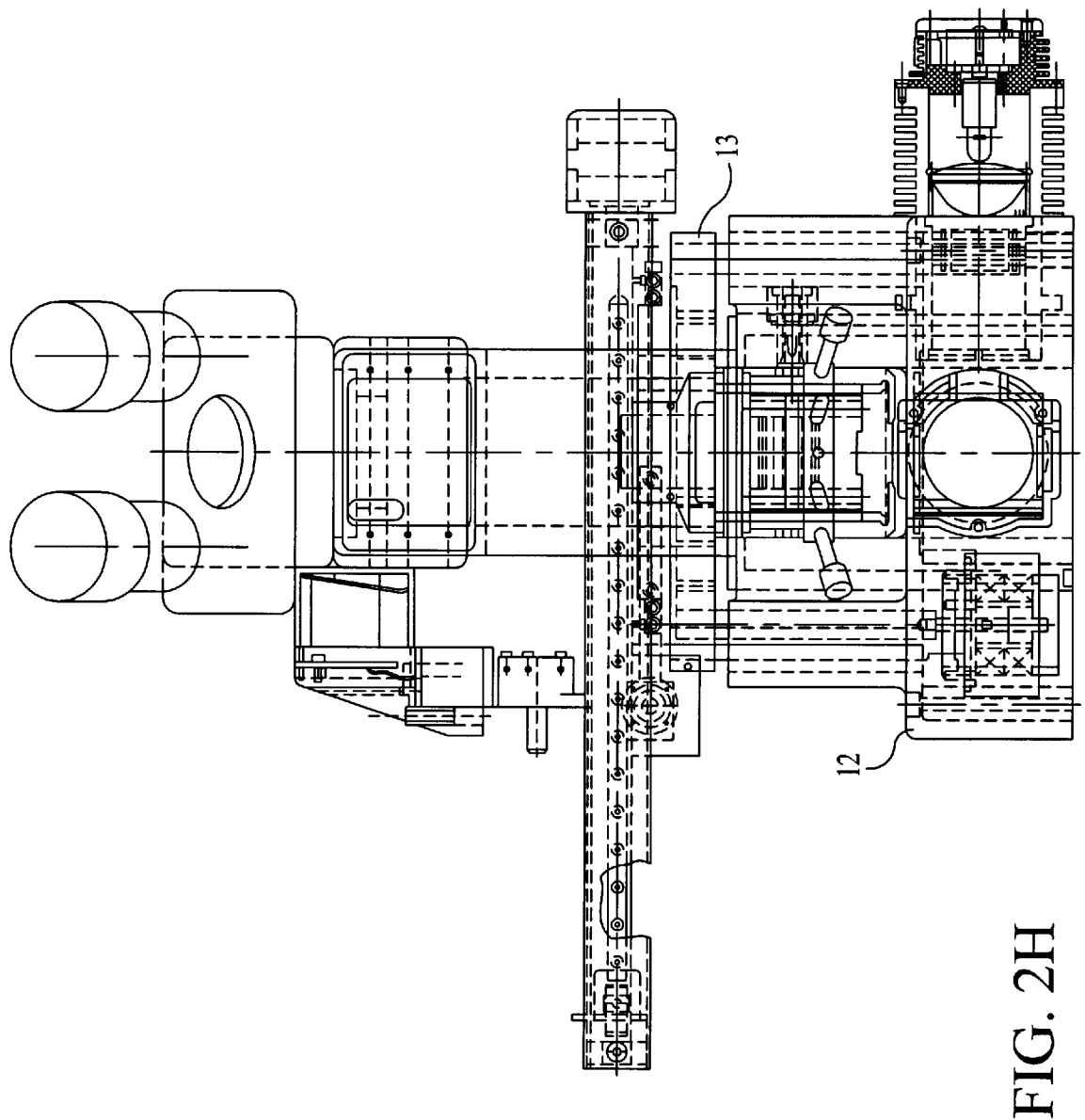
Figure 2I:
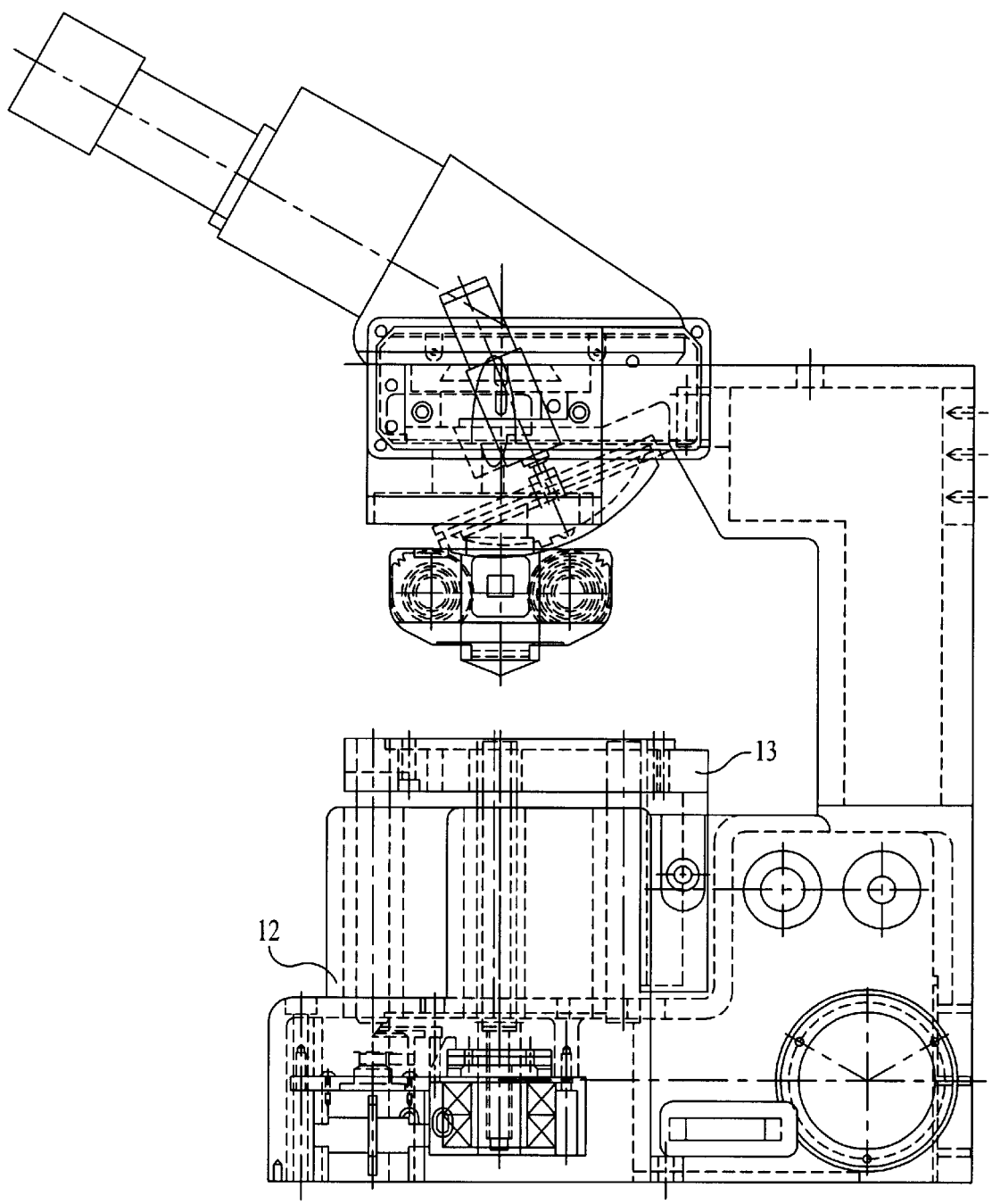

According to the current method and apparatus, the force for moving the stage upward and downward is concentrated at the center of gravity 139, as shown in FIG. 2g. In this manner, the point of force for moving the stage is preferably limited to a single point, typically the center of effort. In an alternative embodiment, there may be a multitude of forces applied at various points on the stage to move the stage upward and downward. The net effect of these forces is that there is an upward or downward force at, or substantially at, the center of gravity of the stage. For example, a multitude of forces may be applied at different points on the stage, with the net force being at the center of gravity of the stage and in the Z direction or in the direction of the optical path. In addition, the application of force at this point inherently maintains stability of the system during movement. The device, or "forcer," that is used to apply force to one point may take a variety of forms. As examples, the forcer make take the form of a piston, lead screw, finger, lever, column, cam, gear system using rack and pinion, or piezoelectric device or voice coil. Referring to FIGS. 2h and 2i, there are shown front and side cutaway views of the microscope assembly.

Figure 3A:
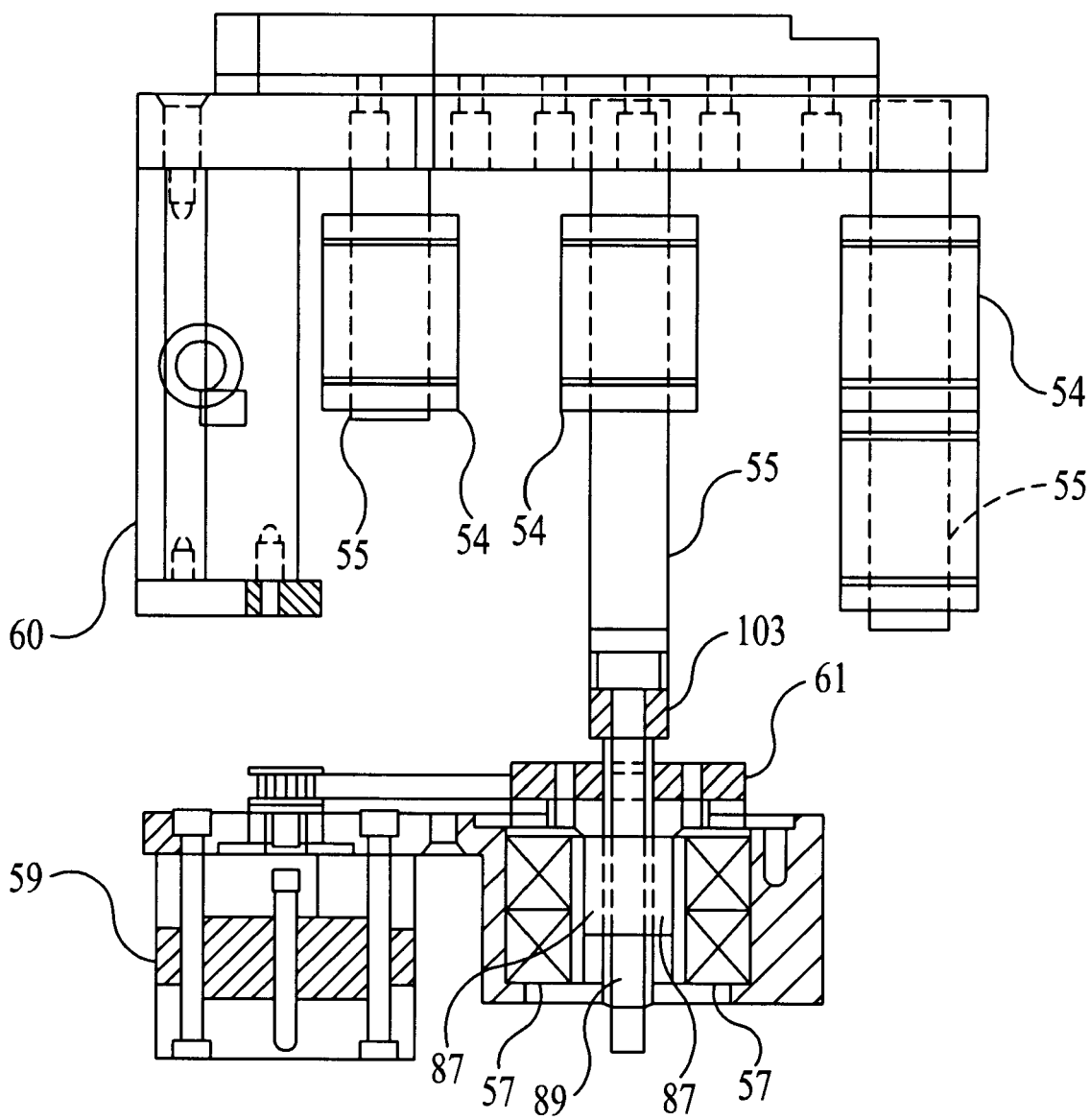
Figure 3B:
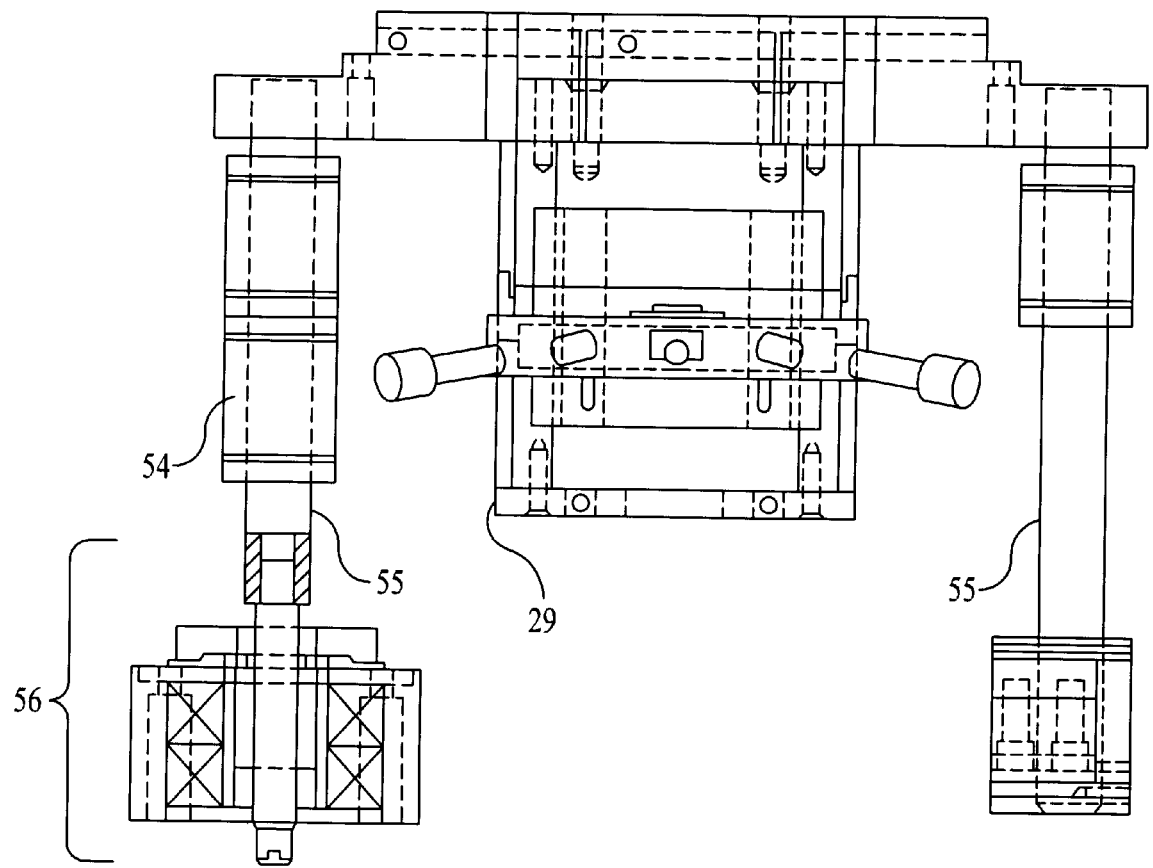
Figure 3C:
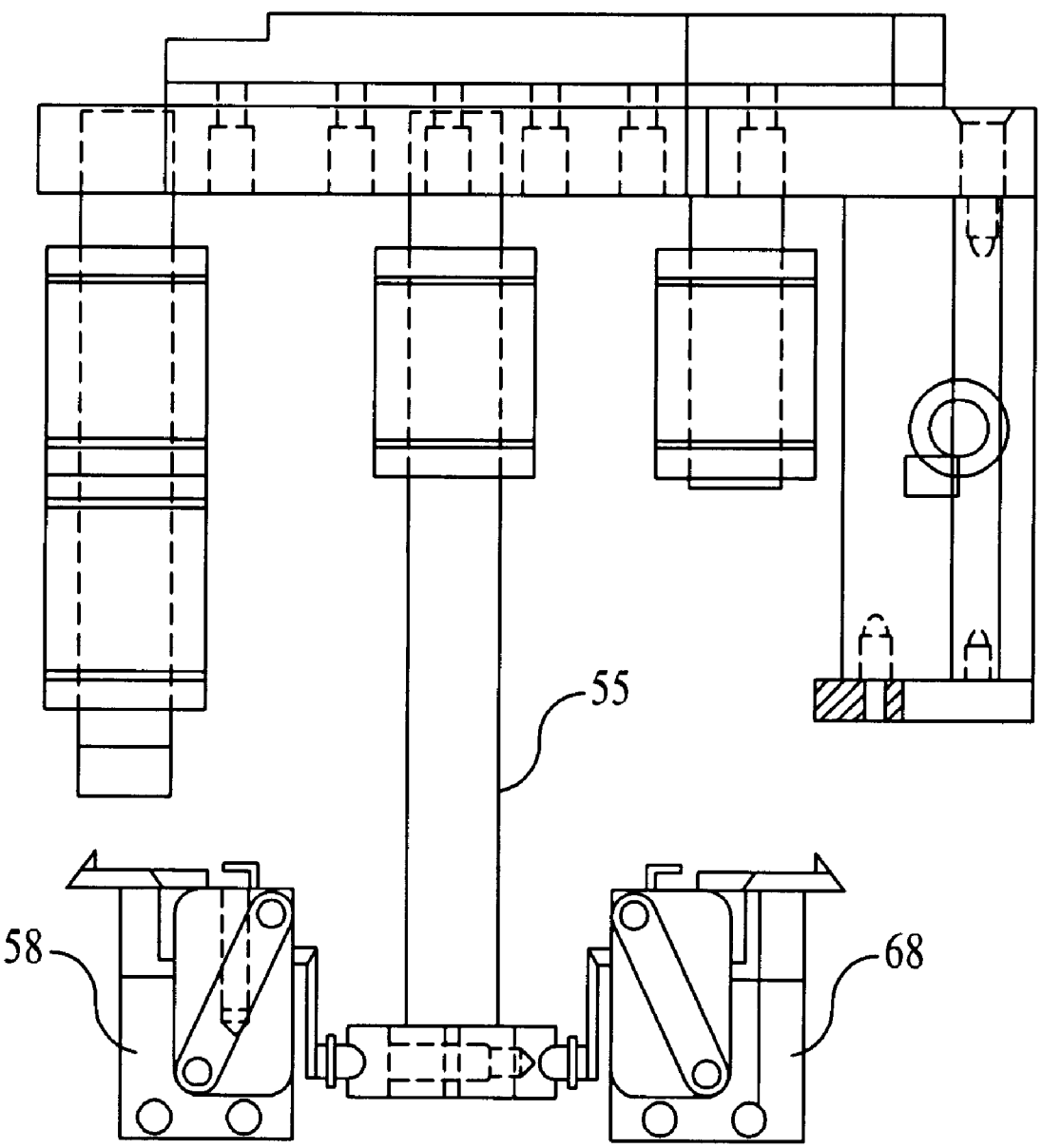

Referring to FIGS. 3a and 3b, there is shown an apparatus 56 located underneath the Z-axis plate 13 for moving the stage 27. The assembly of this apparatus contains ball bearings 57 and nut 87 fixed within the bearings 57. Elevating screw 89, which is in contact with the Z-axis plate, engages nut 87. The Z-axis plate 13 is gravity-loaded against a thrust bearing for the elimination of focusing hysteresis (backlash) while moving the Z-axis plate 13. In an alternative embodiment, the elevating screw, or other means for applying force at one point to the Z-axis plate 13, may be attached to the Z-axis plate 13. A motor 59 and pulley system 61 is located adjacent to the ball bearings 57 and nut 87. Thus, when the Z-axis plate is to be moved vertically, the motor assembly 59 moves the pulley 61, which then turns the bearings 57 and nut 87, which in turn moves the elevating screw 89 via a coupling 103, thereby moving the Z-axis plate 13. Referring to FIGS. 2g, there is shown the motor assembly 137 that applies a point of force on the Z-axis plate 13 at the center of gravity 139 of the Z-axis plate 13. In an alternate embodiment, as shown in FIG. 3b, the motor assembly may be offset from the center of gravity of the Z-axis plate 13. Also shown in FIG. 4g is the field diaphragm 71 and the filter diffuser 73 rigidly affixed to the base.

The stage 27 theoretically does not require anything for operation in addition to the elevating screw 89 and the associated motor assembly. This is due to the fact that the elevating screw 89 moves the stage 27 at its center of gravity. However, on a practical level, the stage 27 may experience movement in the X and Y directions during operation. In order to avoid this movement, a guidance system is used. The guidance system assists in maintaining proper alignment of the stage 27 with respect to the optical axis. The guidance system of the microscope of the present invention is preferably centered or substantially centered around the optical path through the Z-axis plate 13 of the microscope. An optical path is defined as the path through which light passes through the microscope. One portion of the optical path is through the stage 27 of the microscope. Of primary importance are the stability and geometric accuracy of the system at the optical path. According to a preferred embodiment, this stability may be achieved by center the guideposts around the optical path. This is in contrast to guidance systems of typical microscopes, which are not centered around the optical path of the microscope and which may have an overhang of components. These existing systems are typically unstable and are thereby prone to producing yaw, pitch and droop errors of the stage (and therefore the image) due to a lack of stability in design.

In a preferred embodiment, the method for guiding the Z-axis plate 13 is via a plurality of guideposts 55. Each of the guideposts 55 is preferably equidistant from and approximately symmetrically placed around the optical path through the Z-axis plate 13. As shown in FIG. 2g, the center of the locus of points of the guidance system for the Z-axis plate 13 and stage 27 is coincident with the optical path. For example, the guidance system may be clustered in an array, with the array being any number greater than one. The center of that array should be coincident with the optical path. So that, if one takes a cross-section of the guidance system perpendicular to the optical path, that center of the array is at or substantially at the optical path.

The guidance system in one embodiment includes two portions, one portion being a part of or attached (either removably or permanently) to the stage or the plate (such as the Z-axis plate) and the other portion being a part of or attached (either removably or permanently) to the base. For example, in one embodiment, the guideposts 55, which are attached to the Z-axis plate 13, are the first portion and the ball bushings 54, which are attached to the base 12, are the second portion. The guideposts 55 and the ball bushings 54 mate with each other to stabilize movement, and are discussed subsequently with respect to FIGS. 3a–c. The guidance system in another embodiment includes two portions, one portion being an integral part of the stage or plate and the other portion being an integral part of the base. For example, the Z-axis plate may have holes which engage guideposts that are integral with the base or are affixed to the base. In an alternative embodiment, a plurality of guideposts at varying distances from the optical path are used. In particular, a first set of guideposts is a first predetermined distance from the optical path (with each guidepost being at the same first predetermined distance from the optical path) and first angular disposition (the guideposts being distributed around the circumference of the optical path), whereas another set of guideposts is at a second predetermined distance from the optical path (with each guidepost being at the same second predetermined distance from the optical path) and second angular disposition (the guideposts being distributed around the circumference of the optical path).

Referring to FIGS. 2e and 3a–c, there are shown cutaway views of the focus drive and switches of the microscope assembly. Three bore holes 51, 52 and 53, discussed subsequently, to are placed in the Z-axis plate as shown in FIG. 2g. Moreover, recirculating ball bushings 54, as shown in FIG. 3a, are attached to the base 12 and are preloaded into the bore holes 51, 52, 53 of the Z-axis plate. The recirculating ball bushings 54 act as guidepost mates that engage the guideposts 55. Guideposts 55, preferably machined to a tolerance of millionths of an inch, are affixed to the bore holes 51, 52, 53 and run in the bushings 54. The bushings 54 and the guideposts 55 are designed such that they operate with essentially zero clearance. In particular, the bushings 54 contain bearings that arc rolling balls operating in an interference mode with the guideposts 55, so that there is no off-axis motion. Thus, the movement of the stage 27 is vertical with no lateral play. Due to this design, the stage 27 may operate with vertical movement typically in 1/16 micron increments. Other types of guidance systems, such as a linear bearing system, flexure plates, air or magnetic bearings or a dovetail slide with gibs system, are possible as well.

Referring to FIGS. 2a–c, there is shown side, back and top cutaway views of the microscope assembly, respectively. The optical microscope 10 includes a stress annealed aluminum Z-axis plate, having precision bored holes 51, 52, 53. These holes are preferably bored with a key tolerance of about 10 microns. The number of bored holes may vary depending on the mechanics of the microscope assembly. The heat treating of the cast aluminum member increases dimensional stability. In addition, the precision bored holes allow the Z-axis plate 13 to move along the optical path in a smooth manner, i.e., without jittery, shaking or jerky motions, during scanning and focussing. The Z-axis plate 13 is preferably cast aluminum, which may be rough machined. Then, the Z-axis plate 13 may undergo heat treatment for stress relief. Thereafter, the holes may be precisely bored into the Z-axis plate 13 so as to be aligned accurately and non-changeably with time. Therefore, due to the centration of the guidance system around the center of gravity, errors of droop, pitch and yaw tend to nullify or to cancel themselves to zero.

Because of the design of the present invention, the microscope 10 is very precise and accurate. The improved microscope 10, for instance, enables a cytotechnologist or other observer to rapidly, precisely and accurately locate objects of interest with the requisite positional accuracy and precision, e.g., in cytological applications, within ±5 microns. In addition, the microscope of the present invention may be manufactured at a moderate price while still maintaining high precision. In particular, the invention permits development of a system of precise tolerance components which, when assembled with a thermoset plastic material, yields the required performance accuracy. In addition, the system has proven to be dimensionally stable. In order to achieve a level of accuracy and stability similar to the present invention, a conventional microscope would require extremely precise components, rendering the cost of the microscope financially impractical.

Figure 4A:
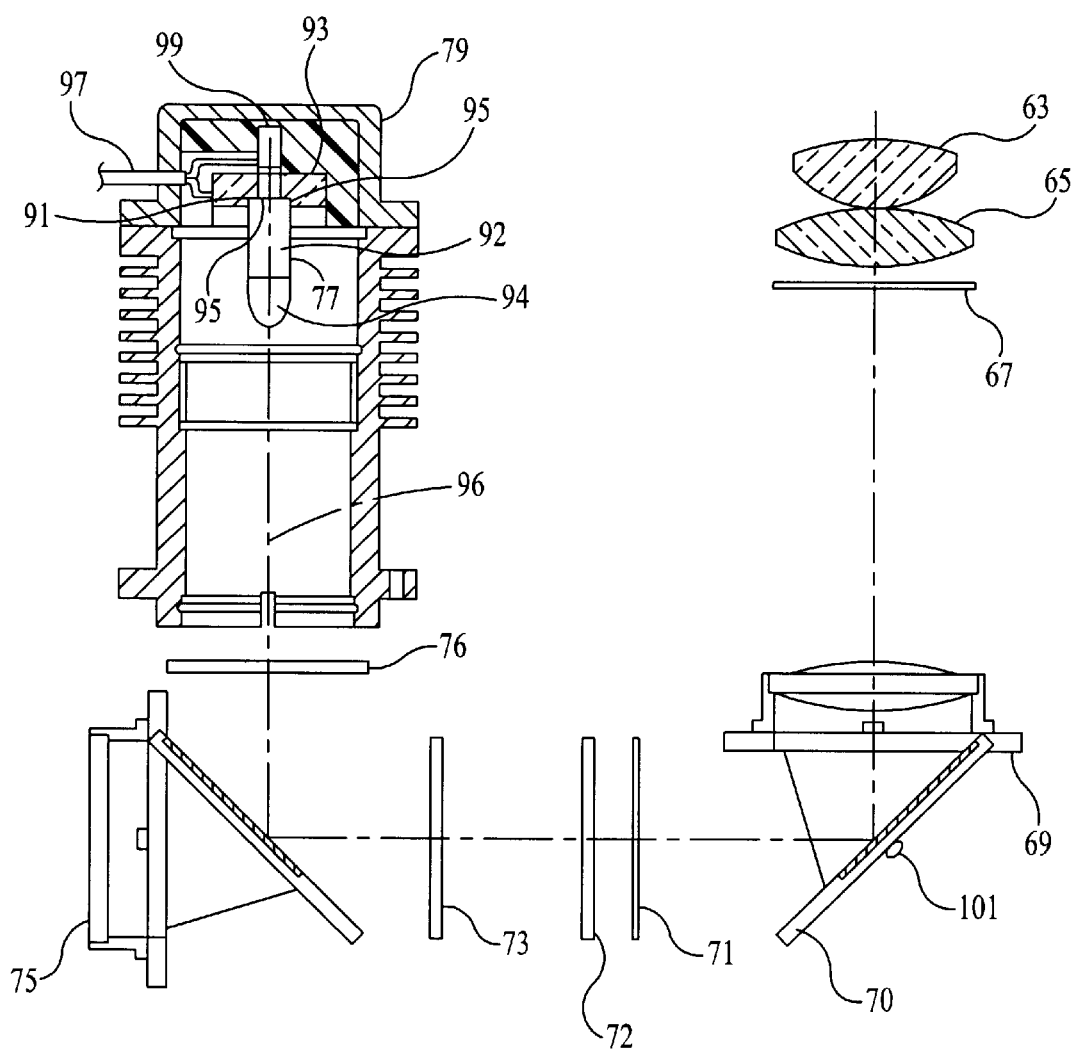

Referring to FIG. 4a, there is shown a side cutaway view of the centralized filament, mirrors and lenses of the microscope assembly. Condenser lenses 63, 65 receive light through a numeric aperture diaphragm 67, which in turn receives light through a mirror system 69, through a field diaphragm 71, a filter diffuser 73, a second mirror system 75, a second filter diffulser 76. Light is generated by a halogen light source or any other light source with a centralized photon emitter (i.e., illumination source). Means have been developed for a photon emission module to be easily replaced without the necessity of complicated or costly efforts at realignment of parts or processes, as discussed subsequently.

In addition, light may be generated from any light source whose photon emitter (e.g., to filament) is at a predetermined location from the base, screw or other mounting geometry of the light source. Once the base or other mounting geometry is properly aligned, the photon emitter is likewise aligned with the optical path due to the predetermined nature of the light source. The optical alignment is therefore obtained by machining components rather than by adjusting the light source, thereby minimizing error. In the case of a centralized photon emitter, the photon emitter is centered with the base or other mounting geometry of the light source.

Such an automated system requires precisely defined illumination. Such defined illumination is required when the system is initially used, throughout the life of use of the lamp (which may decrease in its illumination over time), and throughout the life of any replacement lamps. The present invention thus maintains consistent and precise illumination throughout use of the microscope. In conventional systems, when a light source is initially installed or replaced, the system must be realigned by a technician in order to minimize uneven illumination which may be received by the camera. In an embodiment of the current invention, the design of the system and the light source are such that the system is pre-centered due to the predetermined spatial relationship of the photon emitter with the mounting geometry of the light source and due to the mounting mechanism for the light source on the microscope. Thus, when a light source bums out, replacement of the light source automatically centers the photon emitter, as described below (within 2 thousandths of an inch of the theoretical center line).

Figure 4B:
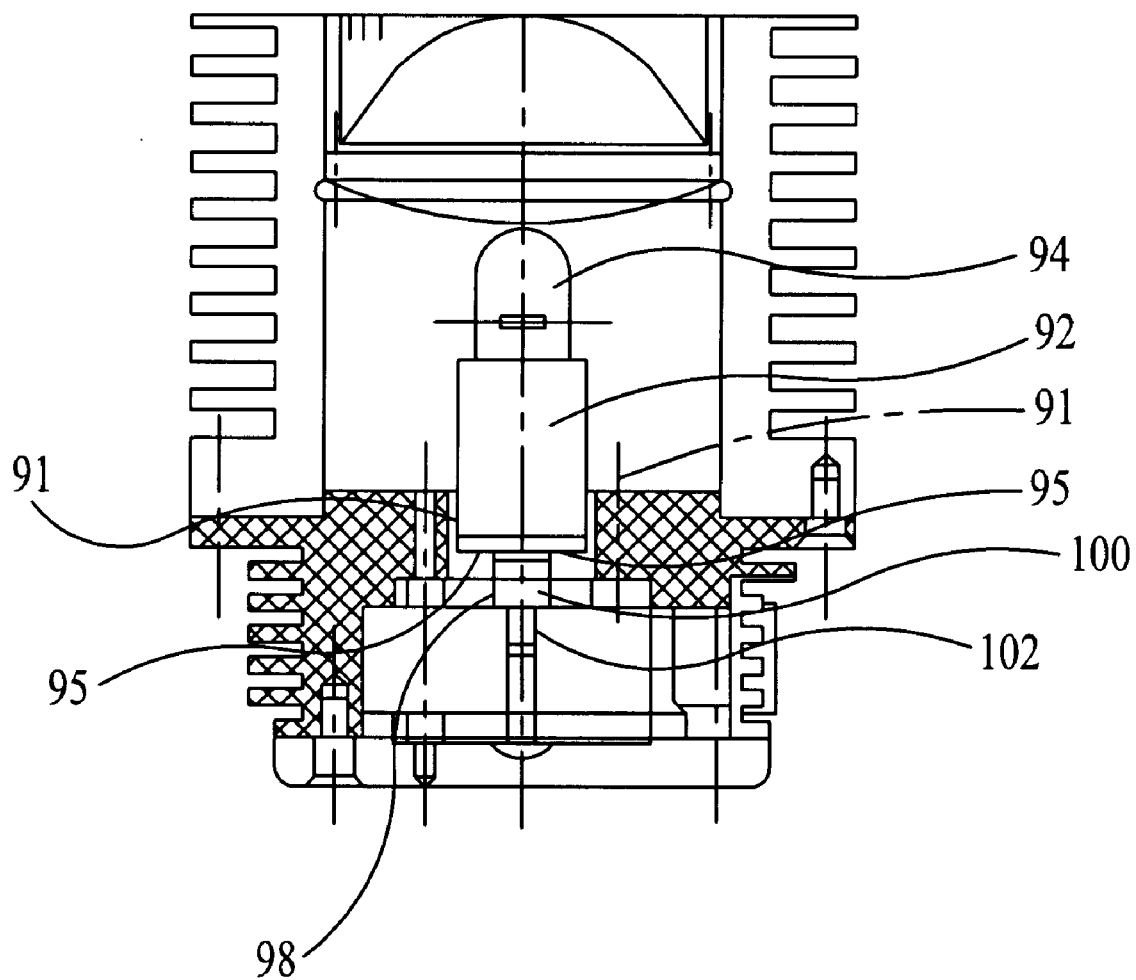

Referring to FIG. 4b, there is shown a cutaway view of the light source assembly. The light system is unlike a conventional microscope light source configuration, at least in part, since it has a photon emitter that is at a predetermined spatial location relative to a reference feature of its housing (e.g., the base 92 or the mounting mechanism for the light source) and due to the mounting mechanism of the microscope. In a preferred embodiment, the light source 77 is a halogen light source with a photon emitter 94 that is at a predetermined spatial location with the base 92, due to precise and accurate manufacturing of the light source. The distance from the base to the photon emitter is 20 millimeters in the Welsh Allen, part no. 1036-1. Since the light source 77 is designed to have a photon emitter 94 at a predetermined axial and radial distance from the base 92 of the light source, the base 92 may be correctly positioned thereby correctly positioning the photon emitter. In this manner, the design of the illumination system enables lamps to be installed with near perfect centration.

In the present invention, any light source may be used, depending on the power requirements, so long as the photon emitter, or the means for generating the light, is at a predetermined axial distance from the base of the light source (i.e., the predetermined distance from one light source to the next is the same within an acceptable tolerance). In a preferred embodiment, a halogen light source is used. In addition, a light source in combination with a fiber optic cable, an incandescent light source, a light emitting diode (LED), an arc lamp (e.g., xenon arc lamp or mercury arc lamp), or other such light source (with or without wavelength selection means) may be used.

The optical path 96 of the system is designed to be directed from the center of the halogen light source with a centralized photon emitter or filament. Therefore, the halogen light source with a centralized photon emitter sends light directly (and with minimal shadowing) onto the physical image on the slide. In particular, in a preferred embodiment, the lamps are manufactured by Welsh Allen, part no. 1036-1, 30 watt halogen light sources with a centralized photon emitter. The housing 79 that receives the lamp is also designed such that the halogen light source with a centralized photon emitter 77 may be placed with maximum accuracy and to placement reproducibility. In this manner, when the base of the light source is positioned properly, the photon emitter of the light source is positioned properly as well.

The housing 79 contains a mounting mechanism for receiving the light source. The mounting mechanism is designed to receive the light source 77 precisely, both concentrically and axially. The mounting mechanism, in one embodiment is an accurate and precise boring of a hole 91 in the housing 79. Other mounting mechanisms, such as clamps, may be employed wherein the mounting mechanisms concentrically and axially place the light source in housing 79.

In addition, the hole 91 is of sufficient axial and radial positional accuracy to provide the imaging system with a positional tolerance of about 0.127 millimeters. This precision boring receives the base 92 of the light source. In addition, a seat 95 is precisely bored and/or shaved so that the base 92 of the light source abuts the hole 91 in perfect alignment. The precision boring of the hole 91 and the seat 95 thereby ensures that the base of the light source 77 is in its proper placement. In addition, a threaded hole 98 is bored to engage the screw mount 100. The screw mount 100 attaches the light source 77 within the housing 79 and makes electrical contact with the compliant contact 102 in the housing 79. Because the photon emitter is at a predetermined location relative to the base, the photon emitter of the light source 77 is in proper alignment and centered at the optical center line. Power is connected to the light source 77 via wires 97 and a connector 99.

In addition to proper placement of the light source, the intensity of the light source can be controlled. In both an operator driven system (in which, for example, the operator views the magnified image through an eyepiece in the viewer) and a detector based system (in which, for example, a detector, such as a camera, receives the magnified image from the viewer and acts as an electronic image viewer), the proper amount of light can be generated to illuminate the sample. In particular, in a detector based system, the detector may have an optimal light level (or optimal light range) under which it operates. For example, when using a camera, the camera has a range of optimal values of light for operation. When the camera receives an image with less than the optimal value of light, it adjusts the shutter speed to lengthen the exposure time. Similarly, when the camera receives an image with more than the optimal value of light, it adjusts the shutter speed to shorten the exposure time. To better capture the image from the detector, the light level should therefore be chosen so that the detector operates in its optimal light range.

In order to accomplish this, a detector is used to sense light that is in the optical path 96. The light travels from light source 77 and is ultimately sent to the viewer. As shown in FIG. 4a, the light travels from the light source 77 to the second filter diffuser 76 to the second mirror system 75 to the filter diffuser 73 to the field diaphragm 71 to the mirror system 69 to the numeric aperture diaphragm 67 to the condenser lenses 63, 65. In order to determine the intensity level of the light, the light may be sensed at any point in the path of the light source through the microscope. In FIG. 4a, the mirror system 69 is a 98/2 mirror that reflects 98% of the incoming light and passes 2% of the light. Behind the mirror system 69, a detector in the form of light intensity monitor system 101 senses light that passes through the mirror system 69. The light intensity monitor system 101 is an electronic component such as a diode that feeds back information to the computer system or processor, which controls the light level of the lamp, as described subsequently. In addition, any form of light detector may be used to sense the light.

Figure 4C:
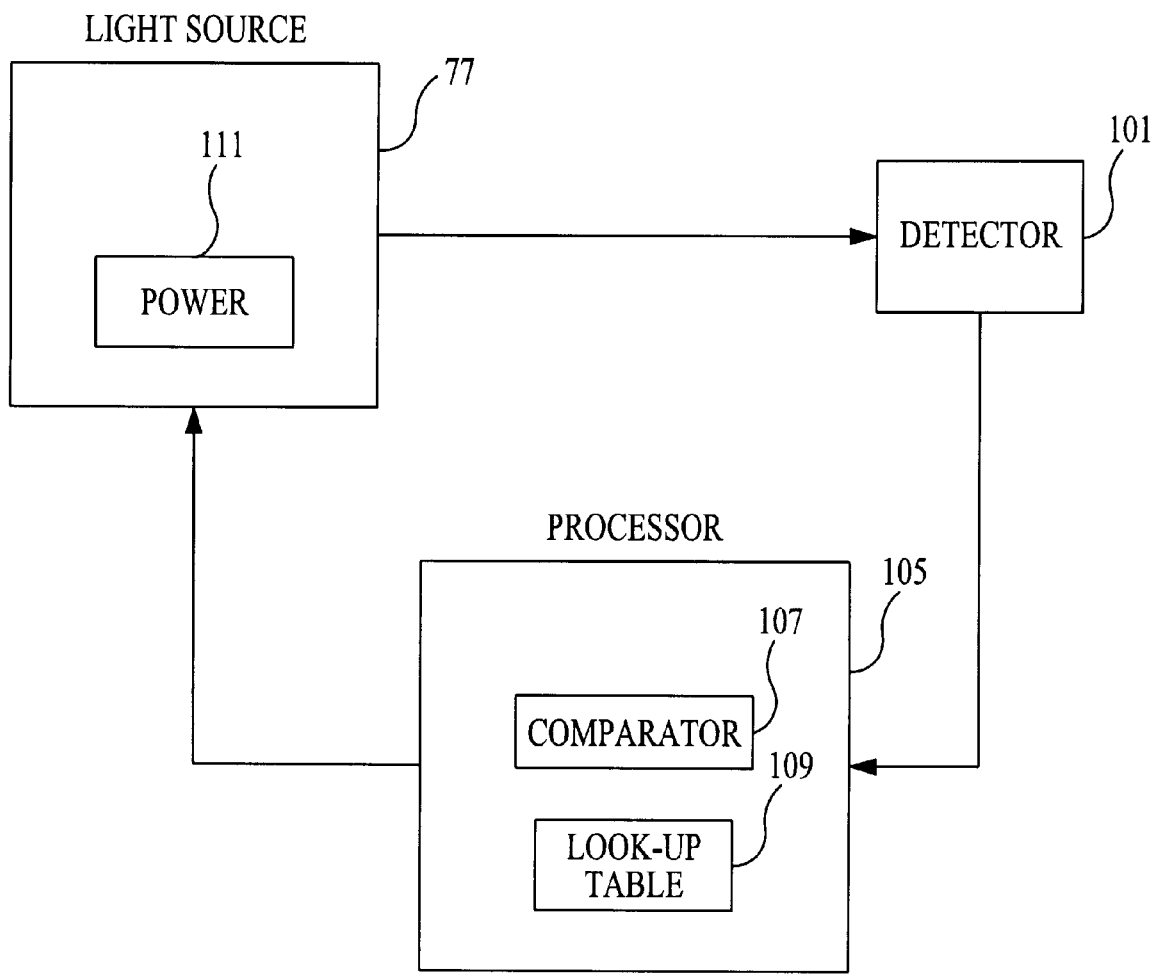

There are methods in which to both sense and control the intensity of the light. Referring to FIG. 4c, there is shown a block diagram of one preferred embodiment of the light feedback system. The light source 77 generates the light and has a power sub-block 111. In one possible embodiment, the power sub-block 111 includes wires 97 and connector 99, which connects to one end of the light source 77. The light is sensed by a detector 105. The detector 101 sends its output to a processor 105, which contains a comparator 107 and a look-up table 109. The look-up table 109 may take the form of a permanent memory such as read only memory (ROM) or a temporary memory such as random access memory (RAM). Depending on the operation of the processor 105, described subsequently with respect to FIG. 4c, the processor alters the amount of power to the light source in order to adjust the level of illumination.

Figure 4D:
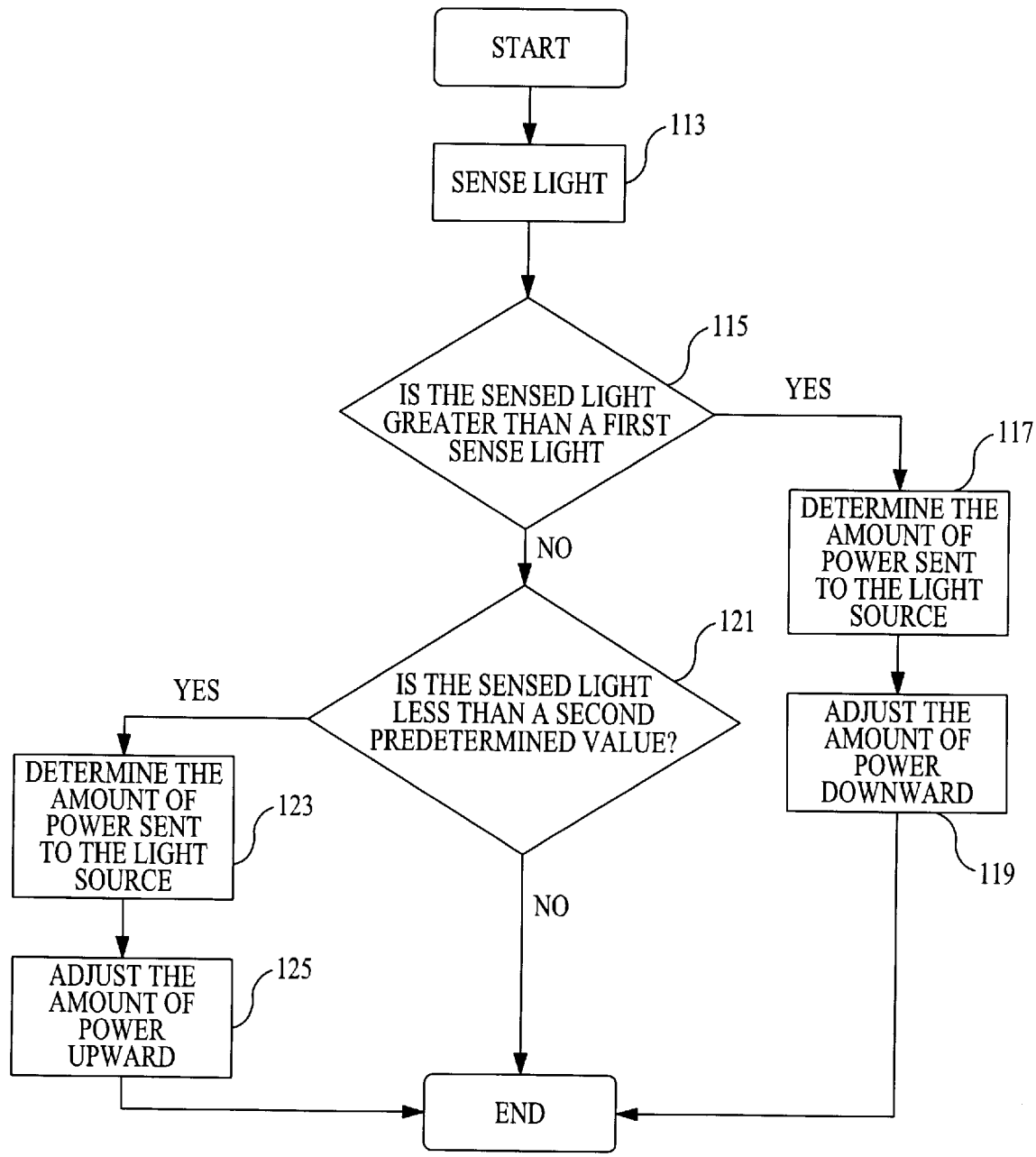
FIG. 4d is a flow chart for the operation of the light feedback system for FIG. 4c.

Referring to FIG. 4d, there is shown a flow chart for determining and modifying the light level in the microscope system to operate at a precise amount of illumination. A portion of the light that is generated from the light source is sensed via a detector, as shown at block 113. This value is sent to the processor 105, which determines whether the amount of light generated is within the optimal range. In particular, the processor determines whether the light is greater than the upper bound of the optimal range, as shown at block 115, or whether the light is less than the lower bound of the optimal range, as shown at block 121. In the preferred embodiment, as shown in FIG. 4a, because of the 98/2 mirror 70, the detector 101 senses 2% of the light.

Therefore, the processor 105 is able to determine, based on the sensed light, how much light is being generated. In addition, the light may be sensed at any point in the optical path, from near the photon emitter 94 of the light source 77 to the condenser lenses 63, 65.

Look-up tables 109 in the processor 105 have a first predetermined value and a second predetermined value. These values define the amount of sensed light from the detector when the light source is operating in the upper limit of the optimal range and the lower limit of the optimal range, respectively. In addition, these predetermined values may be generated during calibration of the microscope. The first predetermined value indicates that the amount of light in the microscope is at the upper limit of the optimal range and the second predetermined value indicates that the amount of light in the microscope is at the lower limit of the optimal range. Using the comparator 107, the sensed light is compared with the first predetermined value to determine if the sensed light is greater than that value, as shown at block 115. If it is, then too much light is being generated by the light source and the amount of power to the light source should be reduced. The sensed light is also compared to the second predetermined value to determine if the sensed light is less than that value, as shown at block 121. If it is less, then too little light is being generated by the light source and the amount of power to the light source should be increased.

To regulate the amount of power to the light source, the processor first determines the amount of power that is currently being given to the light source, as shown at block 117. In one embodiment, this is done by sensing the amount of current sent to the light source. In another embodiment, the processor has the value of the amount of power that corresponds to the amount light detected stored in the look-up table. If the sensed light is greater than the first predetermined value, the amount of power to the light source is reduced, as shown at block 119, corresponding to the amount of the sensed light that is greater than the first predetermined value. On the other hand, if the sensed light is less than the second predetermined value, the amount of power to the light source is increased, as shown at block 125, corresponding to the amount of the sensed light which is less than the second predetermined value. In an alternate embodiment, the light level is adjusted, either upward or downward, by incrementing the current to the light source upward or downward. This determination of the light level in the optical path is preferably continuous when the machine is in use.

In addition to controlling the intensity of the light source, the spectral distribution of the light source should be controlled in order to obtain the proper color-fidelity image. Imaging systems, such as photographic film or cameras, have a certain spectral distribution in which they best operate. In order to obtain the best image from the imaging system, one must choose the illumination from the light source in order to be within the optimal spectral distribution of the imaging system. In addition, analysis of specimens may be spectrally based. In those instances, the correct spectral distribution removes potential error based on varying illumination.

One measure of the spectral distribution is the color temperature. The color temperature is a measure of the intensity of the light at different wavelengths. Therefore, analysis of the color temperature indicates the spectral distribution of the light in the microscope. In an alternative embodiment, the spectral distribution may be sensed at a band of wavelengths or across the entire electromagnetic spectrum.

Typically, an incandescent light source shifts its spectral distribution of the light (and hence its color temperature) when the light source increases or decreases illumination. At the lowest illumination levels, the majority of the incandescent light may be in the infrared light range. As the illumination increases, the peak of the wavelength shifts to the visible light range eventually shifting to the ultraviolet light range.

In order to maintain proper illumination during operation of the microscope, the proper illumination is determined during initial calibration of the microscope. Also, during calibration, measurements are taken at wavelengths to determine the proper intensity at the wavelengths for the proper illumination. Thereafter, during operation, the intensity is tested at the wavelength(s) to determine whether the intensity of the light source should be increased or decreased.

Figure 4E:
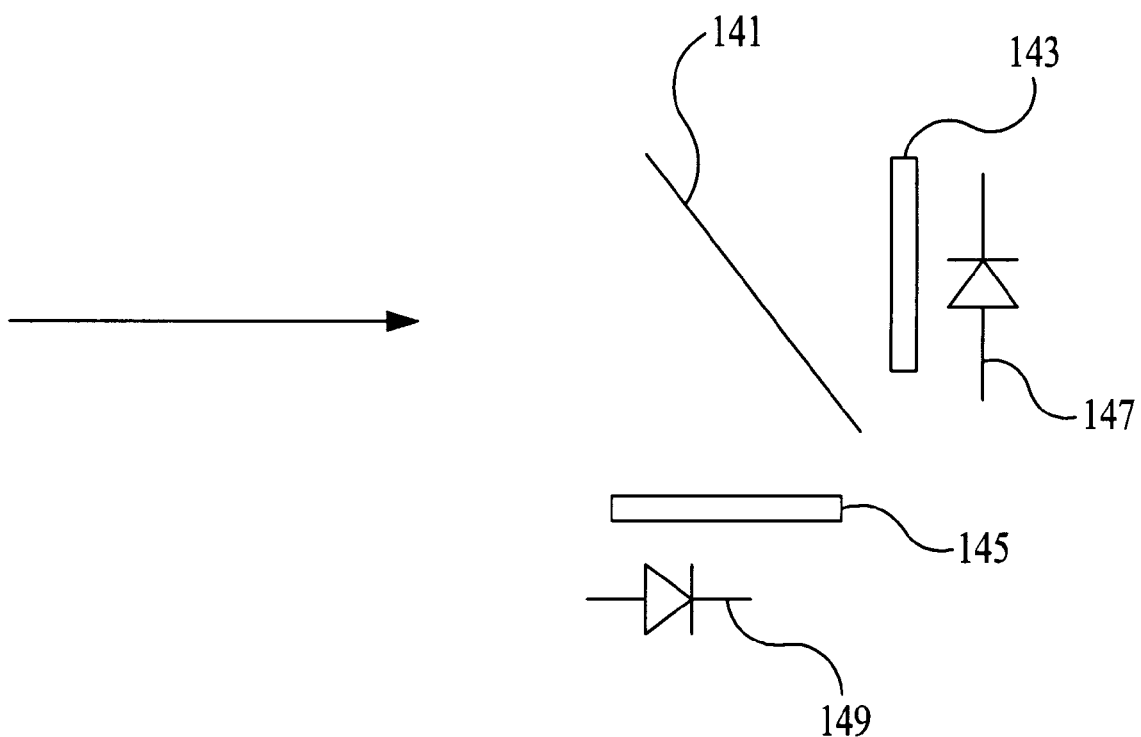
FIG. 4e is a diagram of a color temperature measurement system employed in an embodiment of the invention.

Referring to FIG. 4e, there is shown a diagram of a spectrum distribution measurement do system that measures color temperature. The incoming light is sent to a dichroic beam splitter 141, which splits the light into two parts with high efficiency. Other forms of beam splitters may be used depending on the efficiency necessary. The split beams are then sent to wavelength selection filters 143, 145 whereby a narrow band of wavelengths are passed. Thereafter, the filtered light is sent to Detector $\lambda_1$ 147 and Detector $\lambda_2$ 149 which generates a current (or voltage depending on the sensing circuit) as a function in the corresponding wavelength. Detector $\lambda_1$ 147 and Detector $\lambda_2$ 149 in one embodiment are both photodetectors (e.g., diodes). In another embodiment, the selection filters and diodes may be integrated into one package. Further, in a preferred embodiment, the selection filters and detectors are placed closer, and sense light closer, to the light source 77. In an alternate embodiment, selection filters and detectors are placed closer to the condenser lenses 63, 65 in order to sense any changes in the spectral distribution as light travels through the microscope system.

Figure 4F:
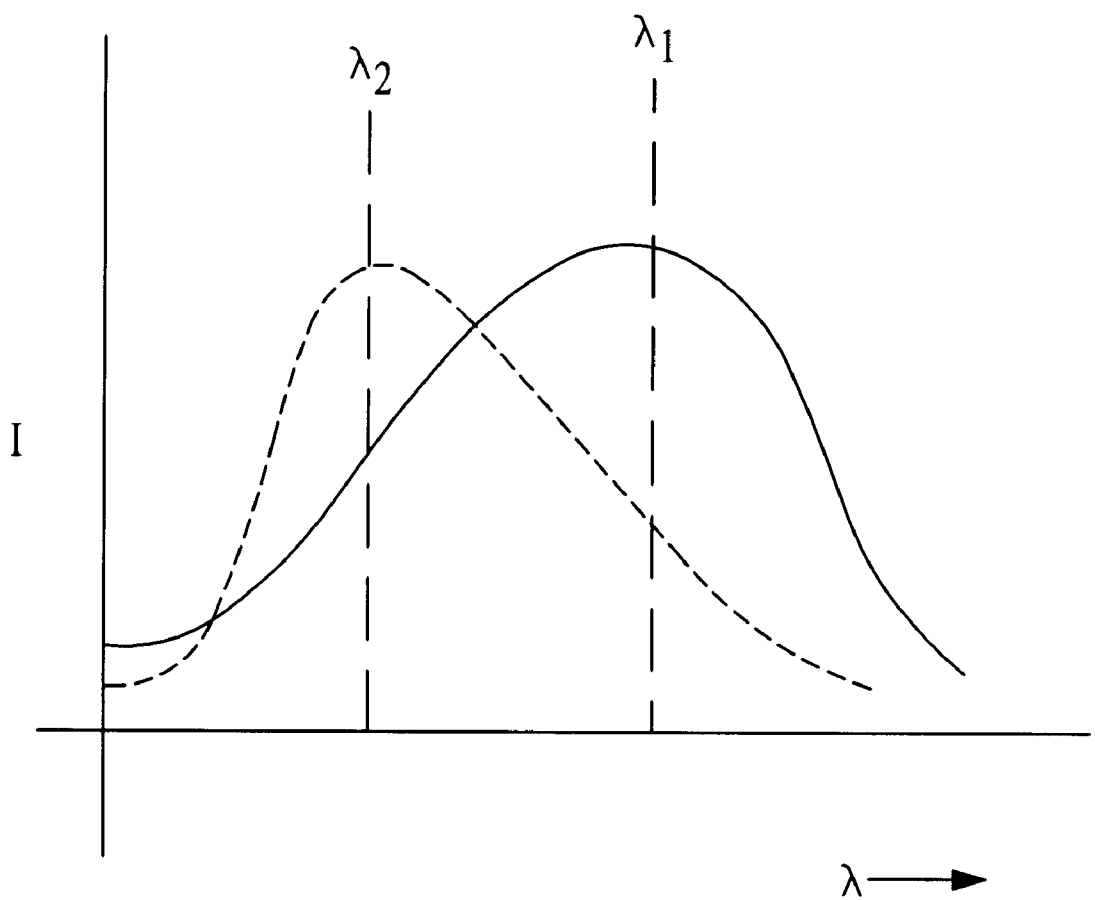
FIG. 4f is a graph of current versus wavelength to determine the color temperature.
Figure 4G:
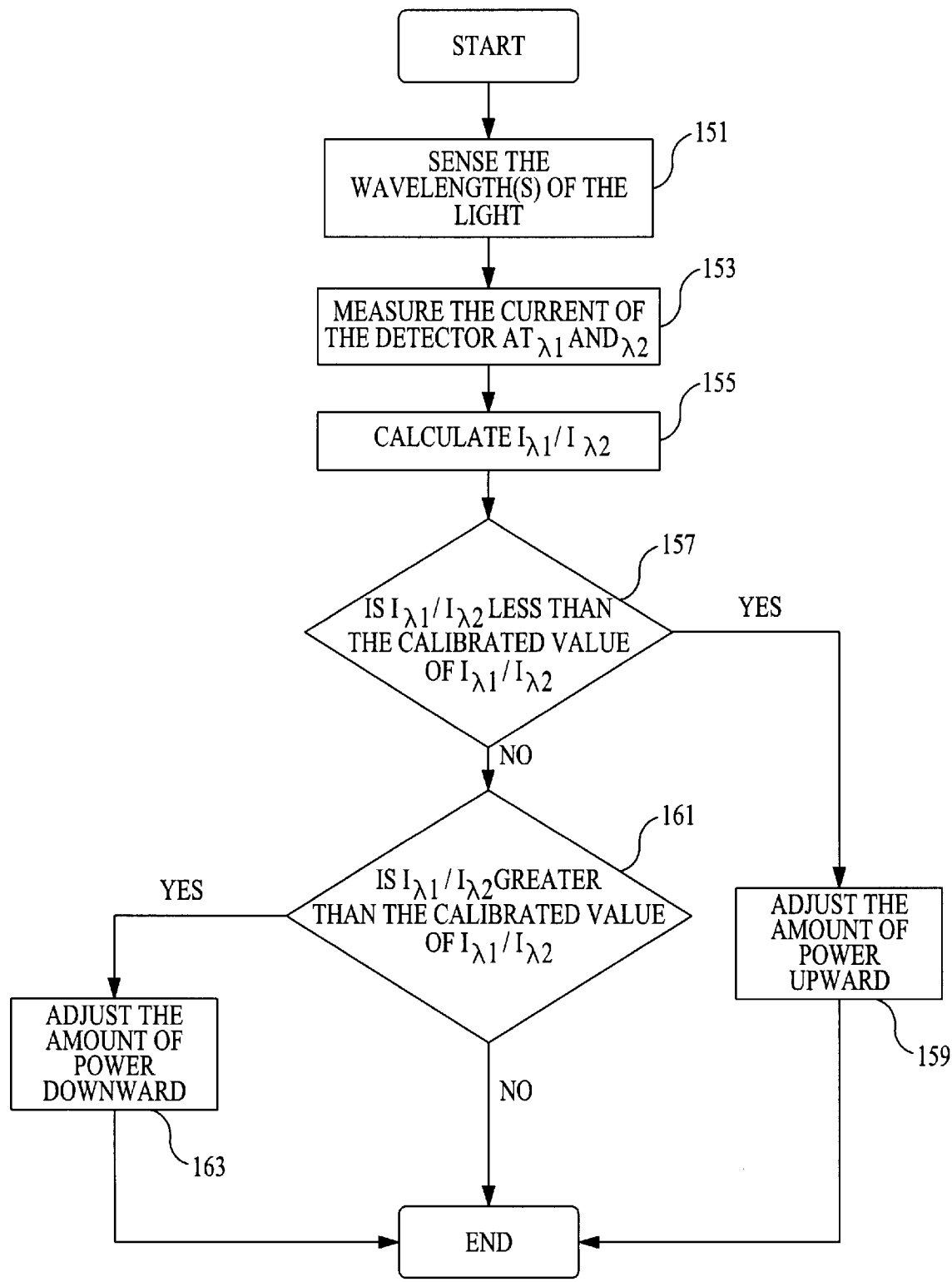
FIG. 4g is a flow chart illustrating steps for determining and modifying the light level in a microscope system according to an embodiment of the invention, in order to facilitate operation at a predetermined spectral distribution.

A graph of a spectral distribution of current (I) versus wavelength ($\lambda$) for two different illuminations is shown in FIG. 4f. Referring to FIG. 4g, there is shown a flow chart for determining and modifying the light level in the microscope system to operate at a predetermined spectral distribution. The color temperature is proportional to $I\lambda_1/I\lambda_2$. Therefore, in order to determine the change in color temperature (and hence spectral distribution), the present measurement of the proportion is compared to the proportion measured during calibration of the system (when the system was operating with an optimal spectral distribution). The amount of light is sensed at certain wavelengths, $\lambda_1$ and $\lambda_2$, as shown in block 151. Depending on the amount of light sensed, currents are generated in the detectors, as shown in block 153.

Depending on the comparison between the outputs of Detectors $\lambda_1$ and $\lambda_2$, and a value which is determined during calibration, the current or voltage of the light source is modified, in order to maintain a constant color temperature (and hence constant spectral distribution). For example, if $\lambda_1$ is greater $\lambda_2$, and the current proportion of $I\lambda_1/I\lambda_2$ is less than the calibrated proportion (which is stored in the same look-up table, or similar look-up table as the table 109 in FIG. 4c), as shown in block 157, the spectral distribution is too far into the infrared range, so the illumination should be increased (by increasing the voltage or current), as shown in block 159. Likewise, if the current proportion of $I\lambda_1/I\lambda_2$ is greater than the calibrated proportion, as shown in block 161, the spectral distribution is too far into the visible region or ultraviolet range, so the illumination should be decreased (by decreasing the voltage or current), as shown in block 163. In this manner, constant color temperature may be maintained in order to optimize the use of the imaging system and maintain the integrity of spectral-based analysis.

As discussed previously with respect to FIGS. 4a–4d, the intensity of the light source may be controlled by varying the current (or voltage) to the light source. The greater the intensity desired, the higher the current (or voltage). However, when attempting to integrate control of both intensity and spectral distribution (or color temperature), means other than modifying the intensity at the light source are used to control the intensity. For example, one may separate the two functions by controlling the color temperature through the adjustment of the lamp power and by controlling the intensity by using crossed polarizers in the optical path. Depending on the intensity required, the polarizers may be turned to modify the intensity of the light. If polarized light is not conducive to the imaging system, a polarizer scrambler may be used in combination with the polarizers. Other means may be used to shield a portion, or all, of the light in the optical path without altering the power to the light source. Another method to modify the intensity without influencing the color temperature is through neutral density filters. Moreover, any means known to those skilled in the art that does not influence the spectral distribution or color temperature but affects the intensity may be used.

In an alternate embodiment, a selection filter placed in front of the detector 101 for the intensity illumination in FIG. 4a may sense data both for color temperature and for intensity. The single detector may sense the intensity at one wavelength. Assuming a constant spectral distribution for a variety of intensities, both the intensity and the color temperature may be determined. Moreover, in an alternate embodiment, a wavelength selection means 72 which selectively passes a single wavelength or a band of wavelengths may be placed anywhere the optical path.

Figure 5A:
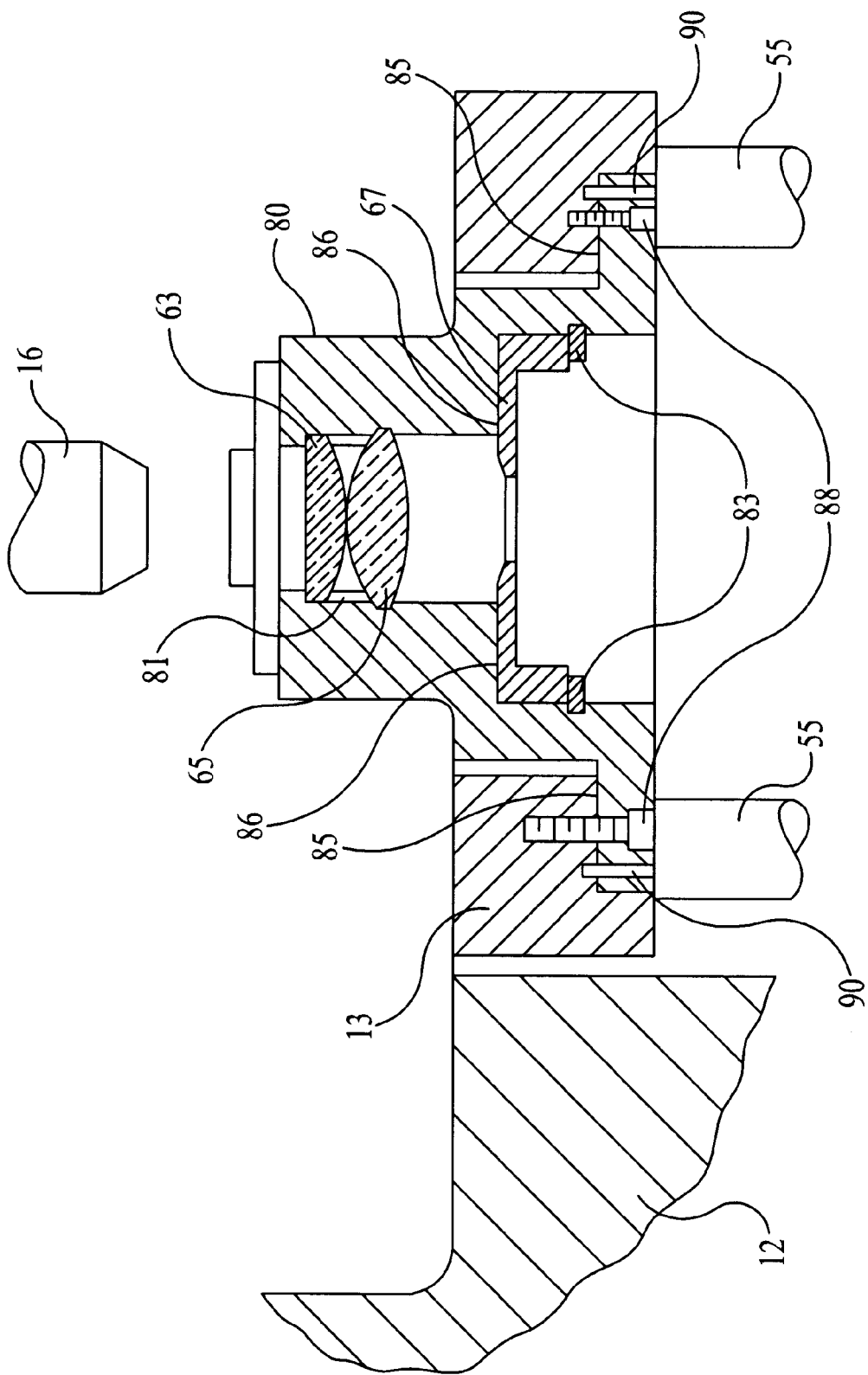
FIG. 5a is a fixed condenser geometry of an imaging system configuration of the microscope assembly shown in one embodiment of the invention.

Referring to FIG. 5a, in one embodiment of the invention that is of particular utility in an automated system, there is shown a fixed condenser geometry of an imaging system configuration of the microscopic assembly, as used in the automated sample analysis system 23 in FIG. 1b. In systems which are completely automated, the optics are designed with fixed rigid optics that are prealigned. During initial calibration of the microscope, the placement of certain optics, including the condenser lens(es) and the numerical aperture, are Therefore, once assembled, aspects such as the focus, the diaphragm size, the aperture, etc. are fixed. FIG. 5a is shown with the lenses all fixed in locations by a condenser lens body 80. Once built, the lenses cannot change in position.

Figure 5B:
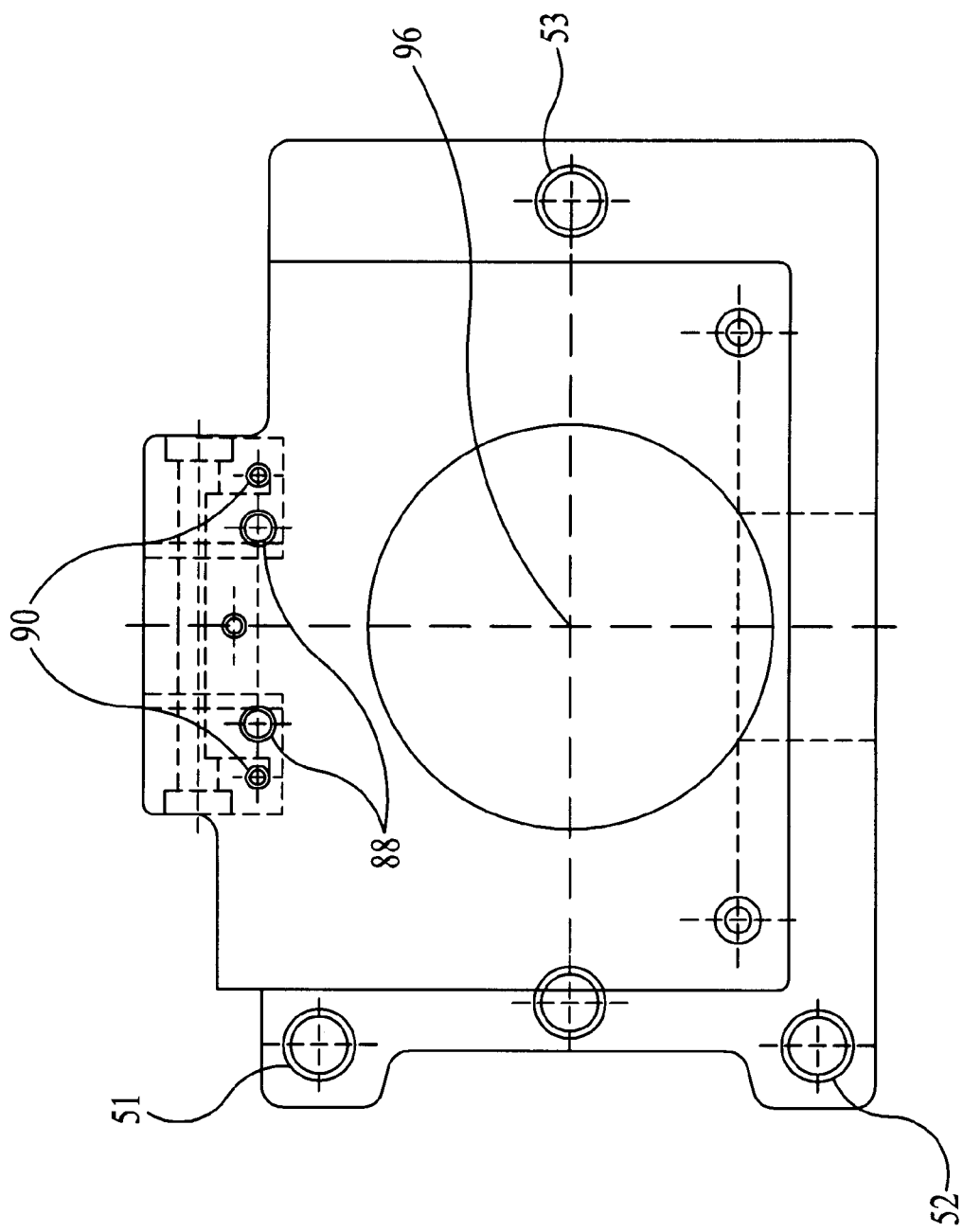
Figure 5C:
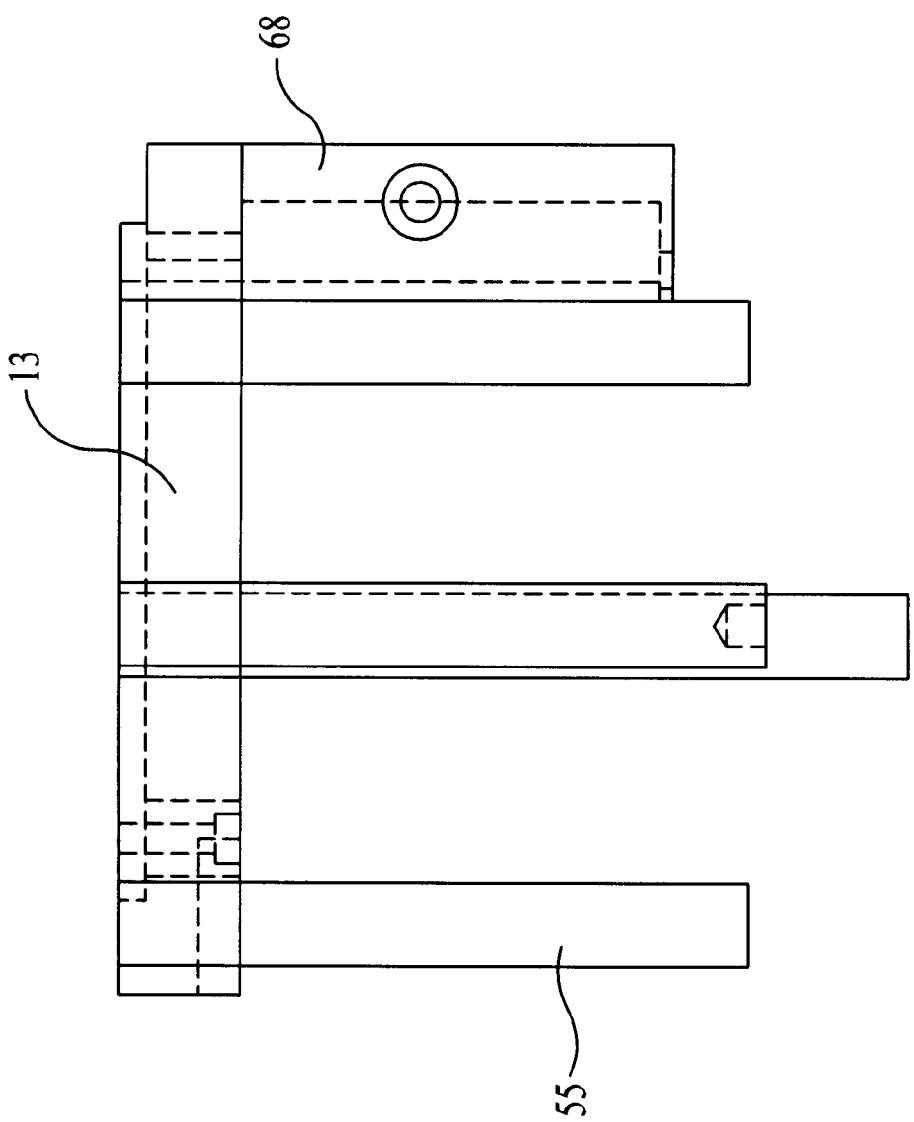
FIG. 5c is a side cutaway view of the fixed condenser geometry FIG. 5b.

In order to design a system that may be configured as a fixed optic system, a portion of the optical system, as shown in FIG. 4a may be designed with the fixed optics, as shown in FIG. 5a. The optical system is reconfigured with lens focusing and pupil apertures all established by machined and locked settings during initial calibration of the microscope. This insures that the system is always in the calibration established at the time of setup. Referring to FIG. 5a, the condenser lenses 63, 65 in one embodiment may be fixed rigidly to the to microscope. Also shown is the objective 16, which is one type of magnification lens. Condenser lens 63 and condenser lens 65 are placed within a housing 68, as shown in FIG. 5c, a predetermined distance apart using spacers 81 to maintain the separation. In addition, numerical aperture 67 has a fixed pupil and is held rigidly by abutting the numerical aperture 67 against a ledge 86 and placing a snap ring 83 to hold the numerical aperture 67 (with a fixed aperture) rigidly in place. The ledge 86 may be machined in order to properly align the numerical aperture 67 during calibration of the microscope. Another ledge 85 may be machined in order to affix the assembly with the condenser lenses 63, 65 and numerical aperture 67. Mounting screws 88 are used to adjust the fit, which is thereafter permanently affixed by pins 90, as shown in FIG. 5a and 5b, so that condenser lens body 80 is attached to the Z-axis plate 13. In this manner, the condenser lenses 63, 65 and the numerical aperture 67 are permanently in focus and do not require adjustment. Further, the field diaphragm 71 is fixed to the base, as shown in FIG. 2g, and has a fixed pupil. In an alternative embodiment, for a light source that is not attached to the base, the field diaphragm may be attached to a portion of the microscope other than the base. However, the field diaphram still has a fixed pupil.

Figure 6:
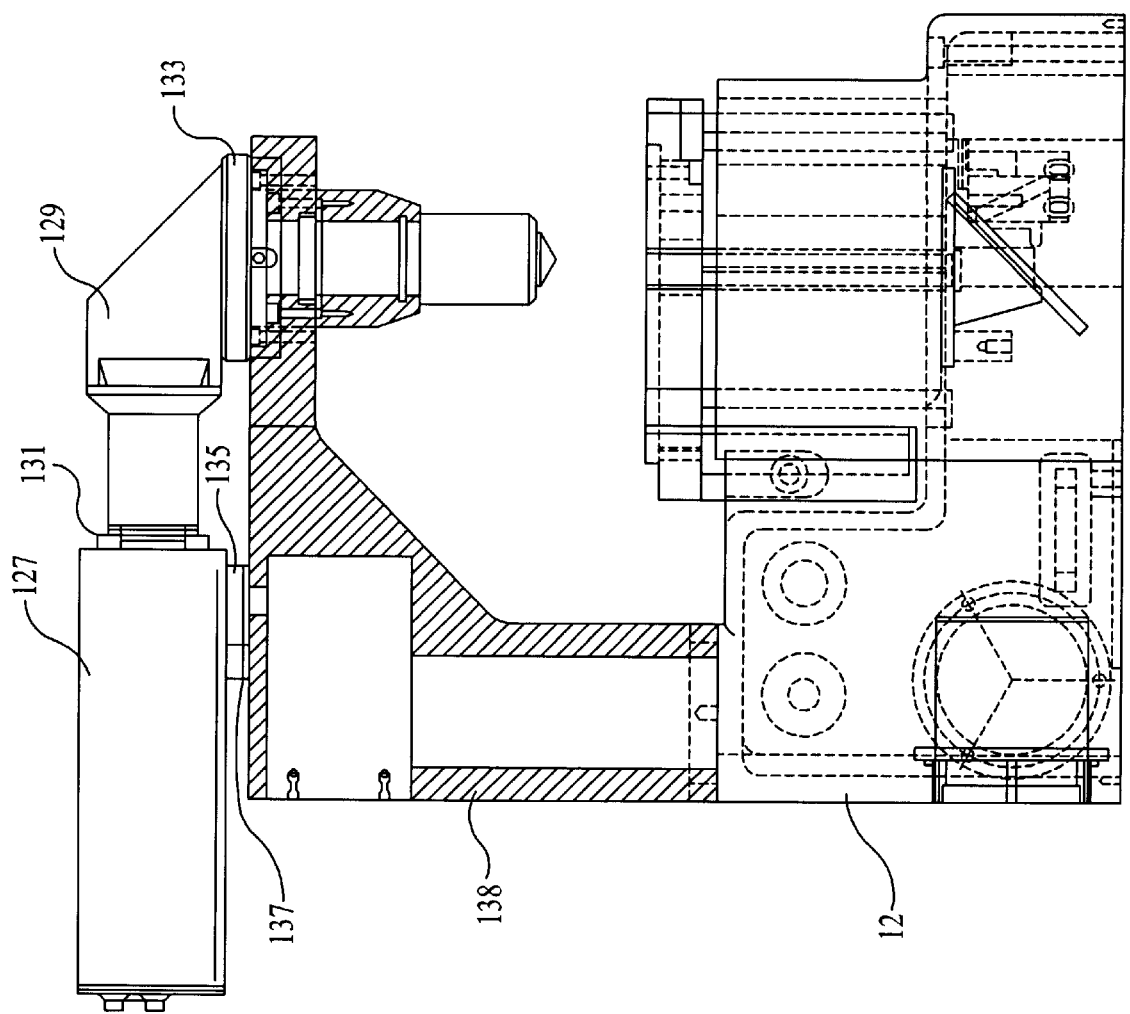
FIG. 6 is a side cutaway view of a microscope assembly and imaging system according to another embodiment of the invention.

Referring to FIG. 6, there is shown a side view of a microscope with an attached imaging system. In one embodiment, the imaging system is a camera 127. The imaging system is affixed to the microscope, according to one embodiment, at two separate places. The first place is at the viewer portion of the microscope. The camera mounts to an extender portion 129.

The extender portion 129, in one embodiment, is L-shaped with one end being connected to the camera via a screw thread C-mount 131 and the other end being connected to the microscope via a dovetail portion 133. In addition, the camera 127 is attached to the body of the microscope at a second place along the upper microscope housing 138 of the camera itself. Referring to FIG. 6, there is shown a second connector, which, in one embodiment is a dovetail portion 135 that is connected to one side of the camera 127. The second connector is also connected to an intermediary piece 137, such as a shim. The intermediary piece is connected to the body of the microscope. In this arrangement, the camera is first aligned via the extender portion 129 and thereafter the camera body is rigidly fixed to mounting surfaces provided on the microscopy frame. The camera is therefore rigidly fixed to the microscope so that during operation, the camera will not be moved out of alignment. The camera may be rigidly fixed to the microscope in more than two places, Moreover, according to a preferred embodiment, the microscopy system is designed to be integrated into a larger system containing additional components. The microscopy system includes mounting geometry and electrical connections sufficient to allow incorporation into other instruments. The imaging system may therefore be designed to minimize problems with interconnections to other devices such as computers and the like. The imaging system includes a connector 62, as shown in FIGS. 2a and 2c. The system is designed with a centralized circuit board 64 which, in turn, is connected to the connector 62. The connector 62 provides data transmission to such components as the DMS discussed above as well as electrical connections. The system may also have fixtures with mounting surfaces for the placement of accessories (such as a laser bar code reader). The added structure provided by these fixtures enhances the stability and thus the accuracy of the system. As shown in FIGS. 2a and 2c, there are ports 66 that provide a connection for all of the on-board systems for the microscope. The ports 66 allow for the connection to other units that may work in combination with the microscope. For example, other devices, such as a dotter, bar-code reader, power lens turret controller, slide sensor and camera controller, etc. may be in communication with the microscope and imaging system via the ports 66, for instance.

A preferred embodiment of the present invention has been described herein. It is to be understood, of course, that changes and modifications may be made in the embodiment without departing from the true scope and spirit of the present invention, as defined by the appended claims.

We claim:

1. A microscope system comprising, in combination:
   a base;
   a plate for holding a sample;
   a guidance system having a first part and a second part attached to the base and a third part attached to the plate, the first part and the second part mating with the third part, the first part proximate to where the third part is attached to the plate, the second part below the first part the first and second part operating in an interference mode with the third part;
   a light source for generating light to irradiate the sample;
   a magnifier for creating a magnified image of the sample;
   a viewer for receiving the magnified image of the sample; and
   an optical path defined cooperatively by said plate, said light source, said magnifier and said viewer,
   wherein the guidance system guides the plate in the direction of the optic path and wherein the guidance system is centered around the optical path for stability of the plate during movement of the plate and wherein there is no movement of the plate off the axis of the optical path.

2. The microscope system of claim 1 wherein the third part of the guidance system includes at least two guideposts, the at least two guideposts are equidistant from the optical path, and the plate has at least two holes.

3. The microscope system of claim 2 wherein the first part and the second part of the guidance system includes ball bushings that envelop the guideposts, wherein the plate has holes, and wherein the ball bushings are preloaded into the holes of the plate.

4. The microscope system of claim 1 wherein the magnifier includes at least one lens.

5. The microscope system of claim 1 wherein the viewer includes an eyepiece for displaying the magnified image to an operator.

6. The microscope system of claim 1 further comprising an imaging system connected to the viewer for obtaining the magnified image from the viewer and producing an electronic image.

7. The microscope system of claim 1 further comprising a stage which includes the plate and further comprising means for moving the stage by applying force to the stage at the center of gravity of the stage.

8. In a microscope system having a light source for generating light to irradiate a sample, a magnifier for creating a magnified image of the sample and a viewer for receiving the magnified image of the sample, the improvement comprising, in combination:
   a base;
   a stage having an optical path through the stage;
   means for canceling yaw, droop and pitch errors of the stage about the optical path while moving the stage, the means for canceling the yaw, droop and pitch errors being connected to the base and the stage; and
   a forcer comprising a screw and means for turning the screw, the screw having an upper portion in contact with a center of gravity of the stare and a lower portion in contact with the means for turning the screw.

9. The microscope system of claim 8 further comprising a thrust bearing and wherein the stage is gravity loaded against the thrust bearing.

10. The microscope system of claim 9 wherein the means for canceling yaw, droop and pitch errors about the optical path includes ball bushings and guideposts, the guideposts being centered around the optical path.

11. In a microscope comprising a base, a plate interconnected to said base, said plate being configured to hold a sample, a light source for irradiating said sample, a magnifier for generating a magnified image of said sample, and a viewer for presenting said magnified image, an optical path defined cooperatively by said plate, said light source, said magnifier and said viewer, the improvement comprising, in combination:
   a plate guidance system including at least a pair of guideposts substantially fixed in relation to said plate and substantially parallel to and centered around said optical path, said guideposts guiding movement of said plate in a direction substantially parallel to said optical path.

12. The microscope of claim 11 further comprising guidepost mates substantially fixed in relation to said base, the guidepost mates mating with the guideposts for guiding movement of said plate in a direction substantially parallel to said optical path.

13. A microscope system comprising, in combination:
   a base;
   a plate for holding a sample;
   a light source for generating light to irradiate the sample;
   means for guiding the plate;
   a plate movement system connected to the base, the plate movement system including a single motor, a single pulley, a forcer, and means for coupling the pulley to the forcer;
   a magnifier for creating a magnified image of the sample;
   a viewer for receiving the magnified image of the sample; and
   an optical path defined cooperatively by said plate, said light source, said magnifier and said viewer,
   wherein a cross-section of the means for guiding the plate, taken perpendicular to the optical path, is centered substantially at the optical path.

14. The microscope system of claim 13
   wherein the means for guiding the plate includes a plurality of guideposts, each guidepost being equidistant from the optical path and being connected to the plate, and
   wherein the means for guiding the plate further includes ball bushings which envelope the guideposts.

15. The microscope system of claim 14 wherein the bushings include bearings that are rolling balls operating in an interference mode with the guideposts, so that there is no motion of the plate in a plane perpendicular to the optical path.

16. A microscope system comprising, in combination:
   a stage for holding a sample, said stage having a center of gravity;
   a stage movement system connected to the stage, the stage movement system including a single motor, a single pulley, an elevating screw, and means for coupling the pulley to the screw;
   a light source for generating light to irradiate the sample;
   a magnifier for creating a magnified image of the sample;
   a viewer for receiving the magnified image of the sample; and
   an optical path defined cooperatively by said stage, said light source, said magnifier and said viewer.

17. The microscope system of claim 16 wherein the stage includes a plate, and wherein the elevating screw is in contact with the plate via a coupler.

18. The microscope system of claim 16 wherein the means for coupling the pulley to the screw includes ball bearings, a nut and a coupler.

19. The microscope system of claim 16 wherein the elevating screw applies a force on the stage at substantially the center of gravity of the stage.

20. The microscope system of claim 18 further including a thrust bearing and wherein the stage is gravity loaded against the thrust bearing.

21. The microscope system of claim 18 wherein the elevating screw and the means for coupling the pulley to the screw are in column.

22. A microscope system comprising, in combination:
   a stage for holding a sample, said stage having a center of gravity;
   a stage movement system in contact with the stage, the stage movement system substantially in column;
   a motor for moving the stage movement system, the motor connected to the stage movement system by at least one pulley;
   a light source for generating light to irradiate the sample;
   a magnifier for creating a magnified image of the sample;
   a viewer for receiving the magnified image of the sample; and
   an optical path defined cooperatively by said stage, said light source, said magnifier and said viewer.

23. The microscope system of claim 22 wherein the stage movement system includes an elevating screw, bearings and a nut.

24. The microscope system of claim 23 wherein the forcer further includes a nut and a motor assembly.

25. In a microscope comprising a base, a stage interconnected to said base, said stage being configured to hold a sample and having a center of gravity, a light source for irradiating said sample, a magnifier for generating a magnified image of said sample, and a viewer for presenting said magnified image, an optical path defined cooperatively by said stage, said light source, said magnifier and said viewer, the improvement comprising, in combination:
   a single motor;
   a single pulley connected to the motor;
   a stare movement system in contact with the stage, the stage movement system connected to the single pulley and substantially in column.

26. The microscope of claim 25 wherein the stage movement system includes an elevating screw, bearings and a nut.

27. A method for moving a microscope stage upward and downward using a plate movement system having a single motor, a single pulley and a stage movement system which is substantially in column, stage having a center of gravity, an upper side and a lower side, the upper side holding a sample, the method comprising, in combination:
   turning the single motor;
   turning the single pulley which is connected to the single motor; and
   moving the stage movement system upward in a substantially vertical manner in order to move the stage.

28. The method of claim 27 further comprising:
   gravity-loading the plate against a thrust bearing for elimination of focusing hysteresis while moving the plate.

29. A microscope system comprising, in combination:
   a base;
   a plate for holding a sample;
   a guidance system having a first part attached to the base and a second part attached to the plate, the first part mating with the second part and operating in an interference mode with the second part, the second part of the guidance system including at least two guideposts, the at least two guideposts being equidistant from the optical path;
   a light source for generating light to irradiate the sample;
   a magnifier for creating a magnified image of the sample;
   a viewer for receiving the magnified image of the sample; and
   an optical path defined cooperatively by said plate, said light source, said magnifier and said viewer,
   wherein the guidance system guides the plate in the direction of the optical path and wherein the guidance system is centered around the optical path for stability of the plate during movement of the plate and wherein there is no movement of the plate off the axis of the optical path.

30. The microscope system of claim 29 wherein the first part of the guidance system includes ball bushings that envelop the guideposts, wherein the plate has holes, and wherein the ball bushings are preloaded into the holes of the plate.

31. A microscope system comprising, in combination:
   a base;
   a stage which includes a plate, the plate for holding a sample;
   means for moving the stage by applying force to the stage at the center of gravity of the stage;
   a guidance system having a first part attached to the base and a second part attached to the plate, the first part mating with the second part and operating in an interference mode with the second part;
   a light source for generating light to irradiate the sample;
   a magnifier for creating a magnified image of the sample;
   a viewer for receiving the magnified image of the sample; and
   an optical path defined cooperatively by said plate, said light source, said magnifier and said viewer,
   wherein the guidance system guides the plate in the direction of the optical path and wherein the guidance system is centered around the optical path for stability of the plate during movement of the plate and wherein there is no movement of the plate off the axis of the optical path.

32. In a microscope system having a light source for generating light to irradiate a sample, a magnifier for creating a magnified image of the sample and a viewer for receiving the magnified image of the sample, the improvement comprising, in combination:
   a base;
   a stage having an optical path through the stage;
   means for canceling yaw, droop and pitch errors of the stage about the optical path while moving the stage, the means for canceling the yaw, droop and pitch errors being connected to the base and the stage; and
   a forcer for applying a net force to one point on the stage which is substantially at a center of gravity of the stage, in order to move the stage through the optical path.

33. The microscope system of claim 32 wherein the forcer is an elevating screw and wherein the means for canceling yaw, droop and pitch errors about the optical path includes ball bushings and guideposts, the guideposts being centered around the optical path.

34. A microscope system comprising, in combination:

a base;

a plate for holding a sample;

a light source for generating light to irradiate the sample;

means for guiding the plate, the means for guiding the plate including a plurality of guideposts and including ball bushings, each guidepost being equidistant from the optical path and being connected to the plate, and the ball bushings enveloping the guideposts;

a magnifier for creating a magnified image of the sample;

a viewer for receiving the magnified image of the sample; and an optical path defined cooperatively by said plate, said light source, said magnifier and said viewer, wherein a cross-section of the means for guiding the plate, taken perpendicular to the optical path, is centered substantially at the optical path.

35. The microscope system of claim 34 wherein the bushings include bearings that are rolling balls operating in an interference mode with the guideposts, so that there is no motion of the plate in a plane perpendicular to the optical path.

36. A microscope system comprising, in combination:

a stage for holding a sample, said stage having a center of gravity;

means for applying a net force substantially at the center of gravity of the stage, the means for applying a net force applying multiple forces on the stage with a net effect of a single force in the direction of the optical path and at substantially the center of gravity of the stage;

a light source for generating light to irradiate the sample;

a magnifier for creating a magnified image of the sample;

a viewer for receiving the magnified image of the sample; and an optical path defined cooperatively by said stage, said light source, said magnifier and said viewer.

37. A microscope system comprising, in combination:

a stage for holding a sample, said stage having a center of gravity;

means for applying a net force substantially at the center of gravity of the stage, the means for applying a net force includes a piston;

a light source for generating light to irradiate the sample;

a magnifier for creating a magnified image of the sample;

a viewer for receiving the magnified image of the sample; and an optical path defined cooperatively by said stage, said light source, said magnifier and said viewer.

38. A microscope system comprising, in combination:

a stage for holding a sample, said stage having a center of gravity;

a forcer disposed substantially at the center of gravity of the stage for applying force to one point on the stage, the forcer including an elevating screw, a nut and a motor assembly;

a light source for generating light to irradiate the sample;

a magnifier for creating a magnified image of the sample;

a viewer for receiving the magnified image of the sample; and an optical path defined cooperatively by said stage, said light source, said magnifier and said viewer.

39. In a microscope comprising a base, a stage interconnected to said base, said stage being configured to hold a sample and having a center of gravity, a light source for irradiating said sample, a magnifier for generating a magnified image of said sample, and a viewer for presenting said magnified image, an optical path defined cooperatively by said stage, said light source, said magnifier and said viewer, the improvement comprising, in combination:

a single forcer disposed substantially at the center of gravity of the stage for moving the stage in the direction of the optical path, said single forcer being the only applied force for moving the stage in the direction of the optical path; and a plate guidance system including at least a pair of guideposts substantially fixed in relation to said stage and substantially parallel to and centered around said optical path, said guide posts guiding movement of said stage in a direction substantially parallel to said optical path.

* * * * *